(12) United States Patent
Shirai et al.

(10) Patent No.: US 10,967,458 B2
(45) Date of Patent: Apr. 6, 2021

(54) METHOD AND DEVICE FOR MANUFACTURING MEMBER HAVING A THROUGH HOLE

(71) Applicant: DENSO CORPORATION, Kariya (JP)

(72) Inventors: Hideaki Shirai, Kariya (JP); Koichiro Yasuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 16/072,970

(22) PCT Filed: Jan. 24, 2017

(86) PCT No.: PCT/JP2017/002344
§ 371 (c)(1),
(2) Date: Jul. 26, 2018

(87) PCT Pub. No.: WO2017/130960
PCT Pub. Date: Aug. 3, 2017

(65) Prior Publication Data
US 2019/0039178 A1 Feb. 7, 2019

(30) Foreign Application Priority Data

Jan. 12, 2017 (JP) .............................. JP2017-003462

(51) Int. Cl.
*B23K 26/38* (2014.01)
*B23K 26/06* (2014.01)
(Continued)

(52) U.S. Cl.
CPC ........ *B23K 26/0648* (2013.01); *B23K 26/064* (2015.10); *B23K 26/0665* (2013.01);
(Continued)

(58) Field of Classification Search
CPC .............. B23K 26/064; B23K 26/0648; B23K 26/389; B23K 26/0665; B23K 26/073;
(Continued)

(56) References Cited

U.S. PATENT DOCUMENTS 8,242,408 B2 8/2012 Hu et al.
2017/0106476 A1* 4/2017 Sakamoto .......... B23K 26/0622

FOREIGN PATENT DOCUMENTS

| JP | 2006175491 A | 7/2006 |
|---|---|---|
| JP | 2007237231 A | 9/2007 |
| JP | 2009184003 A | 8/2009 |

* cited by examiner

*Primary Examiner* — Brian W Jennison
(74) *Attorney, Agent, or Firm* — Harness, Dickey & Pierce, P.L.C.

(57) ABSTRACT

A method for manufacturing a member having a through hole includes a primary formation step, an intensity determination step, a laser modulation step, and a secondary formation step. The primary formation step includes radiating a laser beam to a workpiece member to form a pilot hole having a smaller inner diameter than the through hole while receiving light from the workpiece member at a light detection unit. The intensity determination step includes determining whether a light intensity is equal to or less than a predetermined threshold value. The laser modulation step includes modulating a spatial light phase of the laser beam the intensity of the light is equal to or less than the predetermined threshold value. The secondary formation step includes radiating the laser beam having the modulated spatial light phase to a peripheral part of the pilot hole to form the through hole.

20 Claims, 28 Drawing Sheets

(51) Int. Cl.

| | |
|---|---|
| *B23K 26/073* | (2006.01) |
| *B23K 26/064* | (2014.01) |
| *B23K 26/382* | (2014.01) |
| *F02M 61/18* | (2006.01) |
| *F02M 61/16* | (2006.01) |
| *B23K 26/388* | (2014.01) |
| *B23K 26/03* | (2006.01) |

(52) U.S. Cl.
CPC .......... *B23K 26/073* (2013.01); *B23K 26/388* (2013.01); *B23K 26/389* (2015.10); *F02M 61/168* (2013.01); *F02M 61/184* (2013.01); *F02M 61/1833* (2013.01); *B23K 26/032* (2013.01); *F02M 2200/8069* (2013.01)

(58) Field of Classification Search
CPC .. B23K 26/388; B23K 26/032; F02M 61/168; F02M 61/1833; F02M 6/184; F02M 2200/8069
See application file for complete search history.

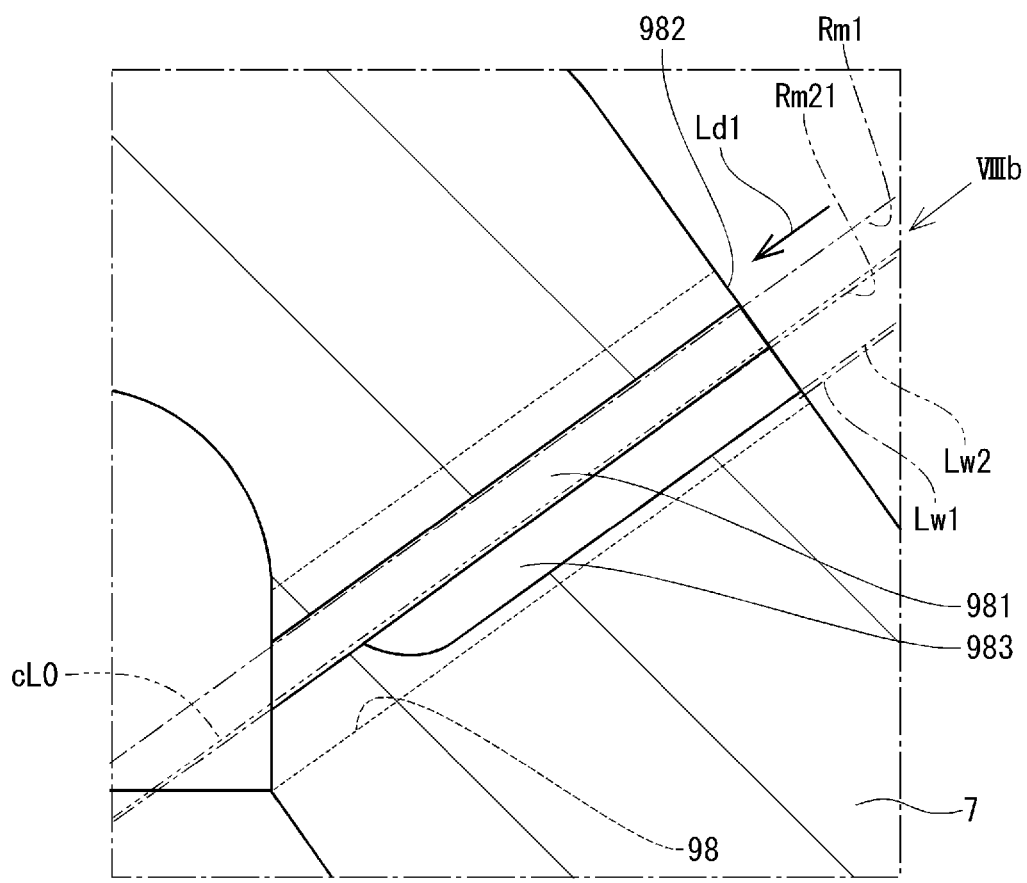

METHOD AND DEVICE FOR MANUFACTURING MEMBER HAVING A THROUGH HOLE

CROSS REFERENCE RELATED APPLICATIONS

This application is a U.S. National Phase Application under 35 U.S.C. 371 of International Application No. PCT/JP2017/002344 filed on Jan. 24, 2017 and published in Japanese as WO 2017/130960 A1 on Aug. 3, 2017. This application is based on and claims the benefit of priority from Japanese Patent Application No. 2016-013075 filed on Jan. 27, 2016 and Japanese Patent Application No. 2017-003462 filed on Jan. 12, 2017. The entire disclosures of all of the above applications are incorporated herein by reference.

TECHNICAL FIELD

The present disclosure relates to a method for manufacturing a member and a device for manufacturing a member.

BACKGROUND ART

Methods for manufacturing members having through holes by using a laser beam are conventionally known. In this method for manufacturing a workpiece member, when a through hole is pierced through the workpiece member, a laser beam passes through the pierced through hole to a side which opposes an irradiated side of the workpiece. In this case, an object on the side which opposes the irradiated side of the workpiece may be damaged by the laser beam. In order to prevent such damage by the laser beam, a laser shielding member which is capable of shielding from laser beam is provided on the side which opposes the irradiated side of the workpiece.

For example, Patent Literature 1 describes a method for manufacturing a member into which a laser shielding member is inserted, when making an injection hole in a fuel injection valve by using laser beam. A laser shielding member formed of a high-melting point material such as corundum and cubic zirconia into a workpiece member that is processed into a nozzle body.

CITATION LIST

Patent Literature

[PTL 1] U.S. Pat. No. 8,242,408 B

SUMMARY OF THE INVENTION

According to the method for manufacturing a member described in the Patent Literature 1, the laser shielding member is gradually damaged by irradiation of a laser beam, and thus needs to be replaced frequently. Therefore, it is necessary to include man hours in the processing steps processing a workpiece member with the laser beam, in order to replace the laser shielding member. The laser shielding member is formed of a relatively expensive material, which can limit the extent of damage for the laser beam, for the method used to manufacture the member described in PTL 1. Since laser shielding members are replaced with some frequency as mentioned above, the cost of manufacturing the members increases.

An object of the present disclosure is to provide a method for manufacturing a member in which damage caused by a laser beam is prevented when forming a through hole on a workpiece member A method for manufacturing a member according to a first aspect of the present disclosure includes a primary formation step, an intensity determination step, a laser modulation step, and a secondary formation step. The primary formation step includes radiation of a laser beam onto a workpiece member to form a pilot hole having a smaller inner diameter than a through hole while light is received by a light detection unit, from the workpiece member.

The intensity determination step includes determining whether an intensity of light detected by the light detection unit is equal to or less than a predetermined threshold value. The laser modulation step includes modulating a spatial light phase of the laser beam that is radiated onto the workpiece member when the light detected by the light detection unit is detected as having a light intensity which is equal to or less than the predetermined threshold value. The secondary formation step includes the radiation of the laser beam which has the modulated spatial light phase onto a peripheral part of the pilot hole to form the through hole.

The method for manufacturing a member according to the present disclosure includes the primary formation step for formation a pilot hole by a using laser beam. The pilot hole has a smaller inner diameter than a through hole in a workpiece member. A beam intensity received by the light detection unit after the pilot hole is penetrated through the workpiece member is smaller than a beam intensity which is received by the light detection unit before the pilot hole penetrates through workpiece member. In this regard, when it is determined that the intensity of beam detected by the light detection unit is equal to or less than a predetermined threshold value, at the intensity determination step, the spatial light phase of laser beam which is radiated onto the workpiece member is modulated in the laser modulation step. The laser modulation step includes modulating the spatial light phase of laser beam to reduce the intensity of laser beam that passes through the finished pilot hole, when the peripheral area of the pilot hole is processed, and to change the spreading angle of laser beam such that a processing amount for the member per unit time is reduced. The laser beam which enters an inside of the workpiece member through the pilot hole thus has reduced energy. As a result, damage from the laser beam to the workpiece member, and to an object located on the side of the workpiece member which opposes the side onto which laser beam is prevented, when the laser beam passes through the pilot hole.

BRIEF DESCRIPTION OF DRAWINGS

The above and other objects, characteristics, and advantages of the present disclosure will be further clarified in the following detailed techniques with reference to the drawings. In the accompanying drawings:

FIG. 8A is a schematic diagram which describes a step of the method for manufacturing a member, which is different from the step of FIG. 6A, according to the first embodiment of the present disclosure;

DESCRIPTION OF EMBODIMENTS

Hereinafter, embodiments of the present disclosure will be described based on the drawings.

First Embodiment

Figure 2:
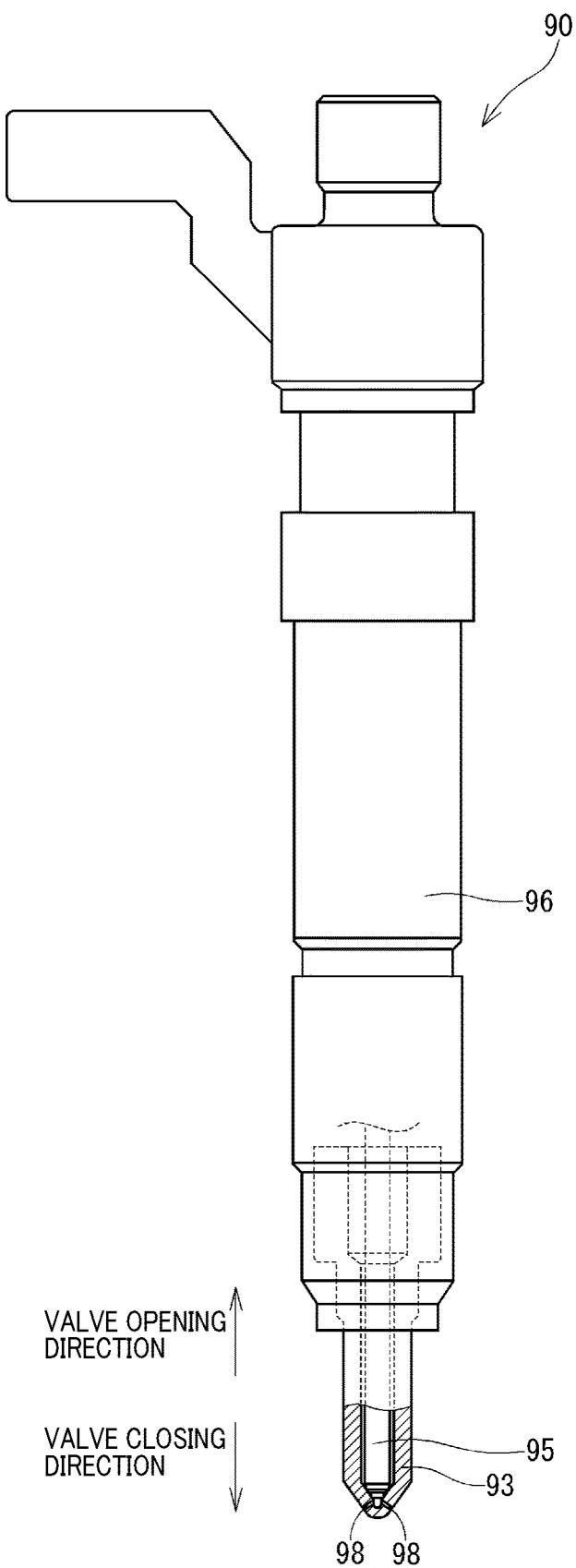
FIG. 2 is a cross-sectional diagram of a fuel injection valve provided with a nozzle body that is manufactured using a manufacturing method for a member according to the first embodiment of the present disclosure.

A laser processing device 1, as a "device for manufacturing a member" according to the first embodiment, is used for manufacturing a nozzle body 93 illustrated in FIG. 2, as a "member" of a fuel injection valve 90 for diesel fuel.

Figure 3:
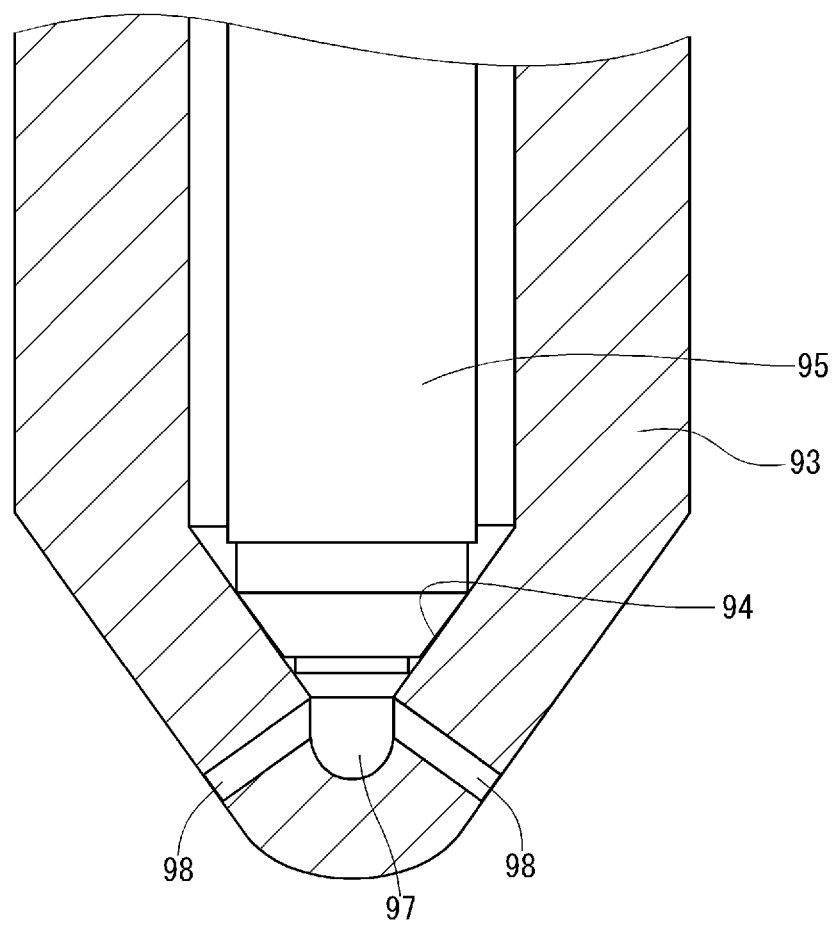
FIG. 3 is an enlarged cross-sectional diagram of the nozzle body of FIG. 2.

First, a configuration of the fuel injection valve 90 will be described. As illustrated in FIGS. 2 and 3, the fuel injection valve 90 includes the nozzle body 93, a needle 95, and an electromagnetic drive unit 96. The needle 95 is provided such that it can abut on a valve seat 94 of the nozzle body 93. The electromagnetic drive unit 96 can drive the needle 95 in an axial direction.

A chamber 97 is sectioned between the needle 95 abutting on the valve seat 94 and the nozzle body 93. The nozzle body 93 has injection holes 98, or "through holes", communicating with an outside of the nozzle body 93 and with the sac chamber 97. Fuel introduced into the nozzle body 93 passes through the sac chamber 97 and the injection holes 98 when the needle 95 separates from the valve seat 94 to be injected to the outside. The laser processing device 1 can form the injection holes 98 into a workpiece member 7.

Figure 1:
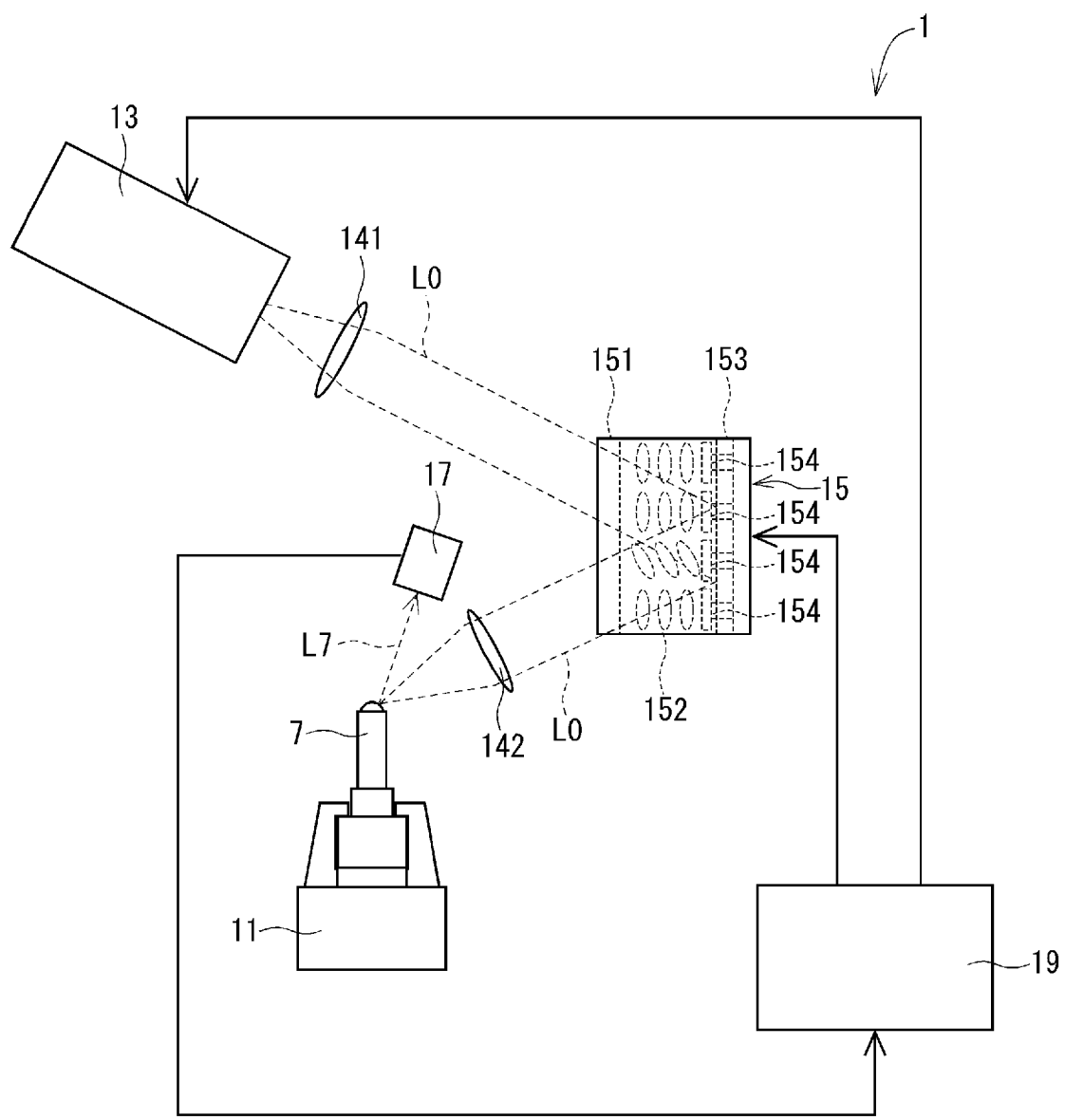
FIG. 1 is a schematic diagram of a device for manufacturing a member according to a first embodiment of the present disclosure.

Next, a configuration of the laser processing device 1 will be described with reference to FIG. 1. The laser processing device 1 includes a member retaining unit 11, a laser oscillator 13, an optical element unit 15, a beam detection unit 17, a control unit 19, and the like. Note that, in FIG. 1, a track of a laser beam in the laser processing device 1 is indicated by a dotted line L0 representing an outer edge of the laser beam. The track of light from the workpiece member 7 is indicated by dotted line L7.

The member retaining unit 11 is formed such that the workpiece member 7 having a bottomed cylindrical shape may be held thereon. The member retaining unit 11 retains the workpiece member 7 such that a laser beam is radiated from the outside of the workpiece member 7.

The laser oscillator 13 oscillates the laser beam capable of forming the injection holes 98 in the workpiece member 7. The laser oscillator 13 is electrically connected to the control unit 19. The laser oscillator 13 oscillates laser beams on the basis of a command signal output by the control unit 19. The laser beams oscillated by the laser oscillator 13 pass through a collimating lens 141 which is provided between the laser oscillator 13 and the optical element unit 15. The laser beams pass through the collimating lens 141 to become collimated beam having adjusted parallel rays. The collimated beam reaches the optical element unit 15.

The optical element unit 15 is what is called a reflective liquid crystal panel, which includes a front glass substrate 151, a liquid crystal layer 152, a rear reflective plate 153, electrodes 154 electrically connected to the control unit 19, and the like. In the optical element unit 15, collimated beam that is incident to an inside of the optical element unit 15 through the front glass substrate 151 is reflected by the rear reflective plate 153 towards a predetermined direction. At this time, a direction of an array of liquid crystal molecules in the liquid crystal layer 152 is changed by a voltage applied to the electrodes 154. Consequently, the optical element unit 15 can modulate the spatial light phase of the laser beam directed from the optical element unit 15 to the workpiece member 7. The laser beam directed from the optical element unit 15 to the workpiece member 7 is condensed through a condenser lens 142 provided between the optical element unit 15 and the workpiece member 7, and radiated on a desired position on the workpiece member 7.

The light detection unit 17 is electrically connected to the control unit 19. The light detection unit 17 is provided on an outside of the workpiece member 7 in the vicinity of a portion of the workpiece member 7. This portion of the workpiece member 7 is a portion onto which the injection hole 98 is processed. The light detection unit 17 can receive reflection light of the laser beam reflected by an outer wall surface of the workpiece member 7, or a plasma light of fine particles which are generated from the workpiece member 7 through the laser beam processing. For example, the light detection unit 17 of the first embodiment can detect light in a wavelength range of 200 to 1200 nm, which thus enables detection of plasma light which is generated by a reaction between fine particles of the workpiece member 7 and the laser beam. The light detection unit 17 outputs an electric signal to the control unit 19 which corresponds to a received intensity.

The control unit 19 is electrically connected to the laser oscillator 13, the optical element unit 15, and the light detection unit 17. The control unit 19 controls the laser oscillator 13 and the optical element unit 15 in accordance with an electric signal which is output by the light detection unit 17.

Figure 4:
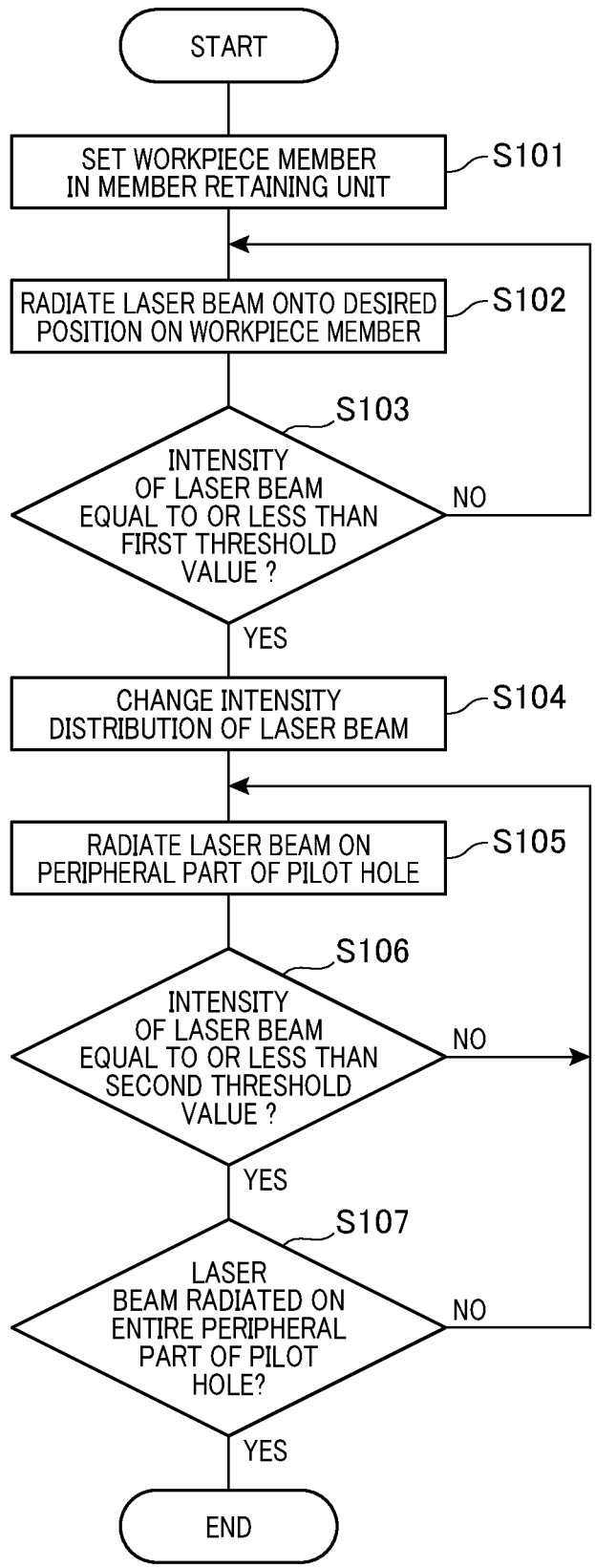
FIG. 4 is a flowchart of the method for manufacturing a member according to the first embodiment of the present disclosure.

Next, a method for processing the workpiece member 7, as a "method for manufacturing a member" according to the present embodiment, will be described on the basis FIGS. 4, 5, 6A, 6B, 7, 8A, and 8B. FIG. 4 is a flowchart illustrating the method for processing the workpiece member 7.

First, the workpiece member 7 is set in the member retaining unit 11 in step 101 (step is simply referred to as "S" hereinafter) 101.

Next, the laser beam is radiated onto a desired position on the workpiece member 7 in S102, as a "primary formation step". The term "desired position" is a substantially central position of the injection hole 98 of the nozzle body 93 into which the workpiece member 7 is processed.

Figure 5:
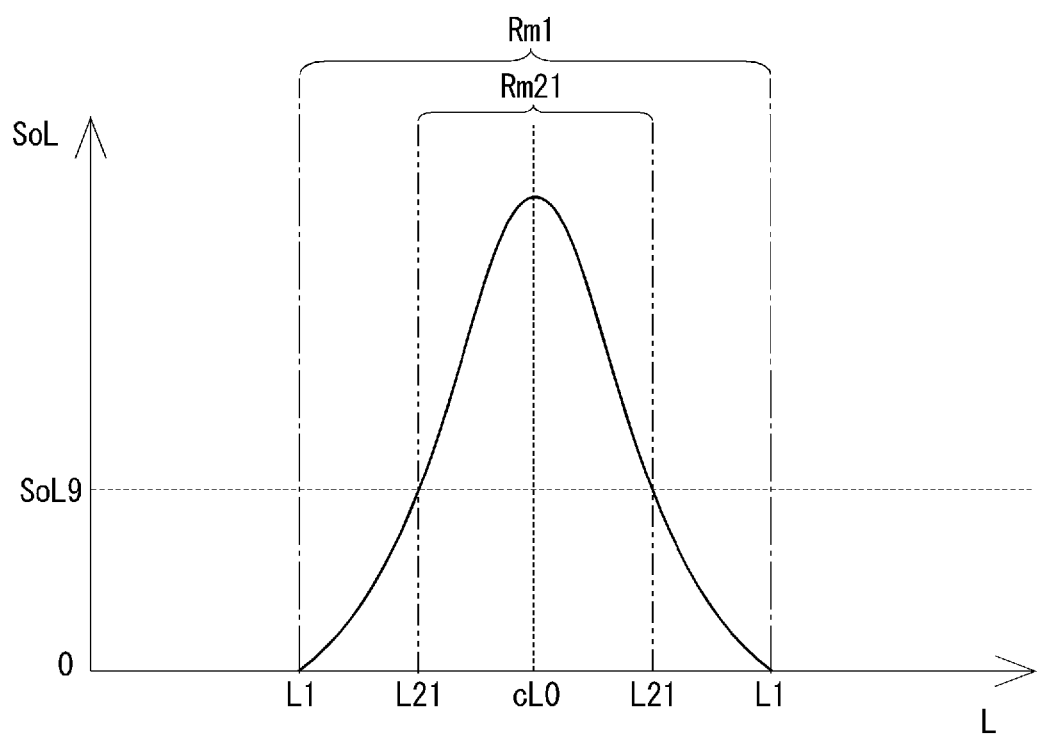
FIG. 5 is a characteristic diagram illustrating an intensity distribution of a laser beam associated with the method for manufacturing a member according to the first embodiment of the present disclosure.

Here, the intensity distribution of the laser beam that is radiated onto the workpiece member 7 in S102 will be described on the basis FIG. 5. FIG. 5 is a diagram illustrating the intensity distribution of the laser beam that is radiated onto the workpiece member 7 through the condenser lens 142, with the intensity of the laser beam distributed in a perpendicular direction to a traveling direction of the laser beam. In FIG. 5, a horizontal axis represents a distance L from a center cL0 of the laser beam. The vertical axis represents the intensity SoL of the laser beam.

In S102, as illustrated in FIG. 5, the workpiece member 7 is irradiated with the laser beam having a beam diameter that is twice the distance L1. The region where the laser beam has an intensity of more than zero is hereinafter referred to as a laser radiation region Rm1. Specifically, the shape of the laser radiation region Rm1 is a substantially circular shape having a radius of the distance L1.

The laser beam which is radiated onto the workpiece member 7 in S102 has the strongest intensity at the center cL0 of the laser beam, and the intensity of the laser beam decreases as a distance from the center cL0 increases. In the present embodiment, assuming that the lowest laser intensity with which the workpiece member 7 can be processed using the method for processing the workpiece member 7 is given as an intensity SoL9, a region which extends from the center cL0 to a distance L21 is a processing region Rm21. This region Rm21 specifically is a region in which the laser beam has an intensity that enables processing of the workpiece member 7. In S102, the laser beam radiated onto the workpiece member 7 has the region Rm21, in which the process can be performed, substantially in the center of the laser radiation region Rm1.

In S102, the control unit 19 controls the optical element unit 15 such that the workpiece member 7 is irradiated with the laser beam which has the intensity distribution illustrated in FIG. 5. In the optical element unit 15, a voltage is applied to the electrodes 154, and the liquid crystal layer 152 is operated such that the laser beam oscillated by the laser oscillator 13 has an intensity distribution which is illustrated in FIG. 5.

Figure 6A:
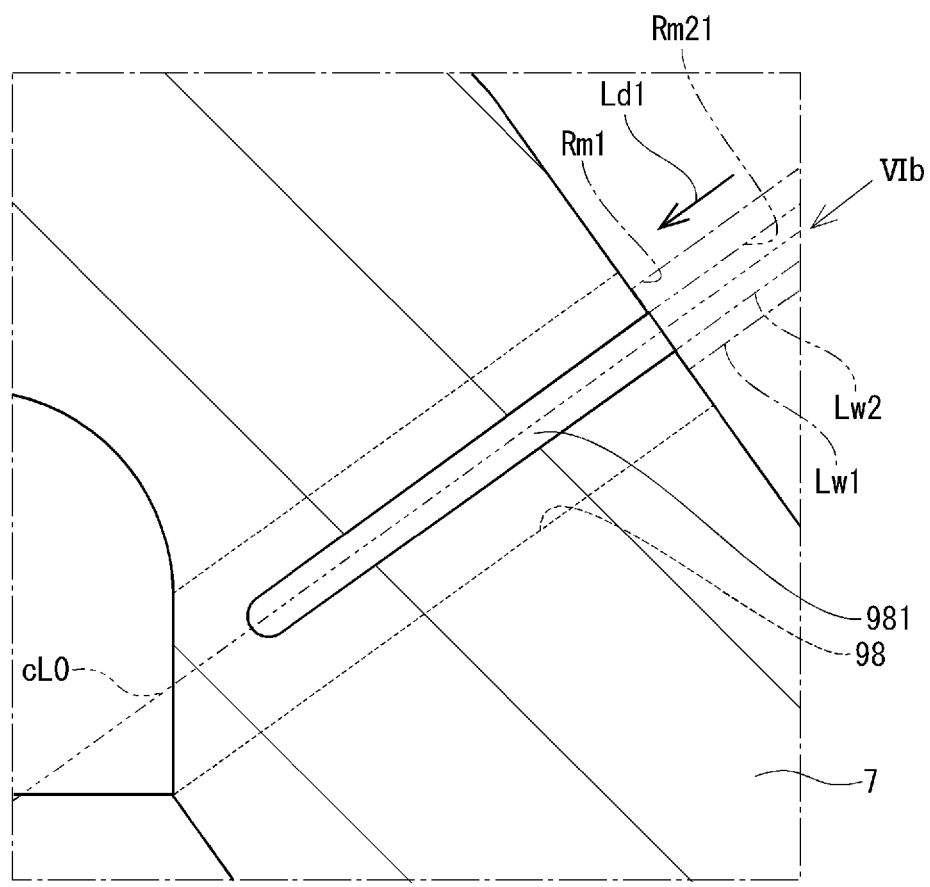
FIG. 6A is a schematic diagram describing a step of the method for manufacturing the member according to the first embodiment of the present disclosure.
Figure 6B:
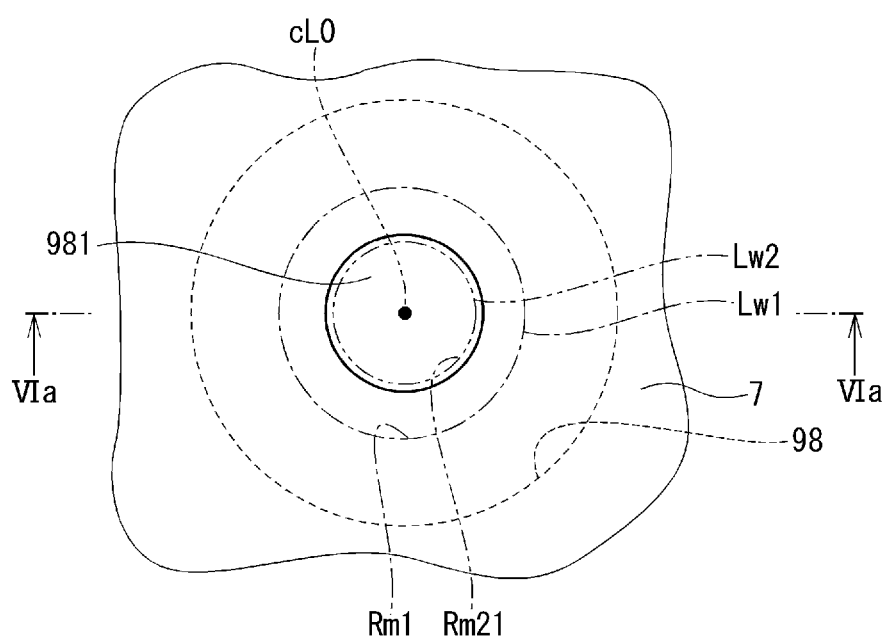
FIG. 6B is a diagram viewed from a direction of an arrow VIb of FIG. 6A.

Next, how the workpiece member 7 is processed in S102 will be described on the basis FIGS. 6A and 6B. FIG. 6A is an enlarged cross-sectional diagram illustrating a portion of the workpiece member 7 which is irradiated with the laser beam. In FIG. 6A, the traveling direction of the laser beam is indicated by a solid arrow Ld1. FIG. 6B is a diagram which is viewed from a direction of an arrow VIb of FIG. 6A. In FIGS. 6A and 6B, an outer edge of the laser radiation region Rm1 defined in FIG. 5 is indicated by dashed line Lw1. The outer edge of the Rm21, which can be processed, defined in FIG. 5 is indicated by dashed two dotted line Lw2.

In S102, the laser beam having the intensity distribution of FIG. 5 is radiated in a substantial center of the injection hole 98 which is to be formed on the workpiece member 7 as illustrated in FIG. 6B. At this time, an inner diameter of a pilot hole 981 (which can also be referred to as a primary hole or an initial hole) which is provided as a pilot hole for the injection hole 98 to be made with the laser beam having the intensity distribution of FIG. 5. The inner diameter of the pilot hole 981 is smaller than the inner diameter of the injection hole 98 which is indicated by the dotted lines in FIGS. 6A and 6B. Since the laser beam does not have an intensity which enables processing of the workpiece member 7 in regions other than the region Rm 21, damage is not caused to the outer wall. Consequently, in S102, the pilot hole 981 is formed on the portion of the workpiece member 7 which is irradiated with the laser beam in the processing region Rm21, that is, the region Rm21 which can be processed, as illustrated in FIGS. 6A and 6B.

In S102, when the workpiece member 7 is irradiated with the laser beam, a reflection of light or plasma light from the workpiece member 7 is received by the light detection unit 17. The light detection unit 17 outputs an electric signal corresponding to the intensity of the received light to the control unit 19.

Next, it is determined in S103, as an "intensity determination step", whether the intensity of the reflection of light or the plasma light from the workpiece member 7 is equal to or less than a first threshold value, as a "predetermined threshold value".

Once the pilot hole 981 is made through the workpiece member 7, a part of the laser beam which is radiated onto the workpiece member 7 enters the workpiece member 7 through the finished pilot hole 981. Therefore, once the pilot hole 981 is completed and passes through the workpiece member 7, an intensity of light reflected from the workpiece member 7 decreases. In other words, it is determined whether the pilot hole 981 is completed to pass through the workpiece member 7 on the basis of a change in the intensity of reflection light.

When the workpiece member 7 is processed with a laser beam, atoms constituting fine particles of the workpiece member 7 which are generated by this process are excited by the laser beam, and due to the excitation, plasma light is generated. Therefore, once the pilot hole 981 is made through the workpiece member 7, the intensity of plasma light from the workpiece member 7 decreases since an amount of the fine particles generated is reduced. In other words, it is determined whether the pilot hole 981 is completed and passes through the workpiece member 7 on the basis of a change in the intensity of plasma light.

In S103, the control unit 19 determines whether the intensity of reflection light or plasma light from the workpiece member 7 which is received by the light detection unit 17 is equal to or less than the preset first threshold value. If it is determined that the intensity of light received by the light detection unit 17 is equal to or less than the first threshold value, the method proceeds to S104. If it is determined that the intensity of light received by the light detection unit 17 is equal to or greater than the first threshold value, the method returns to S102, and continues to irradiate the workpiece member 7 with the laser beam which has the intensity distribution illustrated in FIG. 5.

If it is determined in S103 that the intensity of reflection light or plasma light from the workpiece member 7 which is received by the light detection unit 17 is equal to or less than the first threshold value, next, the intensity distribution of the laser beam is changed in S104, as a "laser modulation step".

Figure 7:
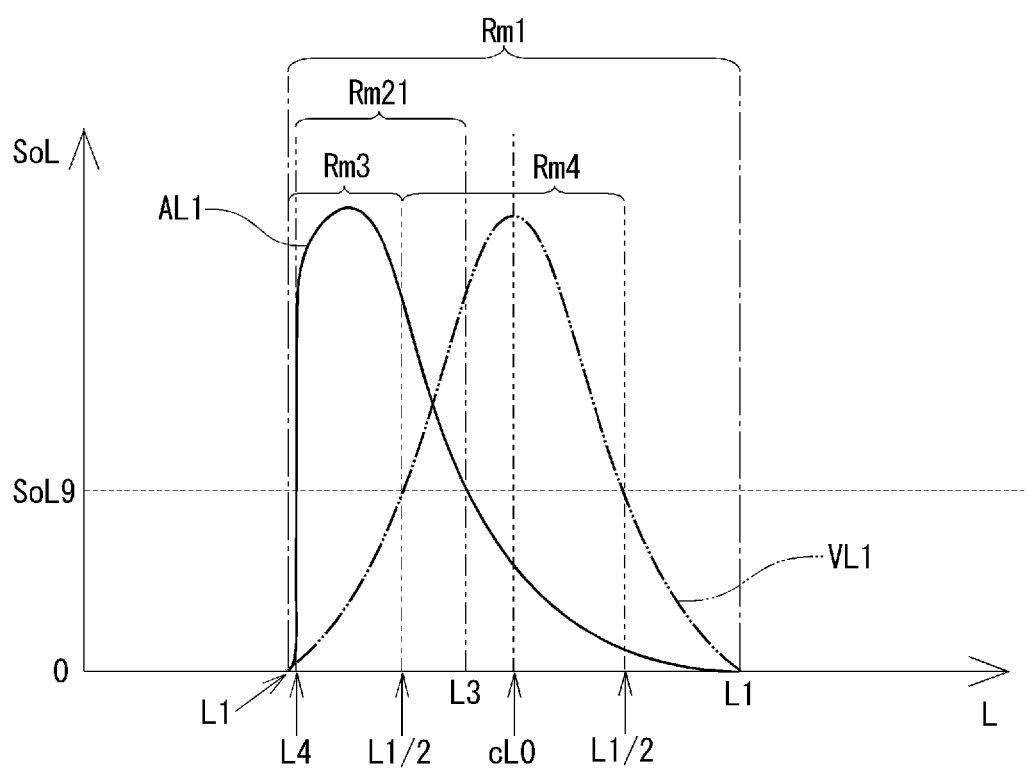
FIG. 7 is a feature diagram illustrating the intensity distribution of the laser beam, which is different from the intensity distribution of laser beam of FIG. 5, according to the method for manufacturing a member of the first embodiment of the present disclosure.

Here, the intensity distribution of the laser beam which is changed in S104 will be described on the basis FIG. 7. FIG. 7 is a diagram illustrating the intensity distribution of the laser beam that is radiated onto the workpiece member 7 through the condenser lens 142. The intensity of the laser beam is distributed in the direction which is perpendicular to the traveling direction of the laser beam. In FIG. 7, a horizontal axis represents the distance L from the center cL0 of the laser beam. A vertical axis represents the intensity SoL of the laser beam. In FIG. 7, note that an intensity distribution of the laser beam which has changed in S104 is indicated by solid line AL1, and the intensity distribution of the laser beam used for formation the pilot hole 981 in S102 is indicated by dashed-two dotted line VL1.

As illustrated in FIG. 7, although the laser beam modulated in S104 has a beam diameter that is twice as large as the distance L1, the laser beam has the strongest intensity at a different position from the center cL0 of the laser beam. Specifically, the spatial distribution of the laser beam is modulated such that energy of the center region Rm4, which is nearer in distance (L1/2) to center CL0, is distributed to be lower than the energy of the outer edge region Rm3. As a result, as illustrated in FIG. 7, the processing region Rm21 which is located between a distance L3 and a distance L4 is shifted from the center of the laser radiation region Rm1.

In S104, the control unit 19 controls the optical element unit 15 such that the workpiece member 7 is irradiated with a laser beam having the spatial distribution illustrated in FIG. 7. In the optical element unit 15, a voltage is applied to the electrodes 154, and the liquid crystal layer 152 is operated such that the laser beam oscillated by the laser oscillator 13 has the intensity distribution illustrated in FIG. 7.

Figure 8B:
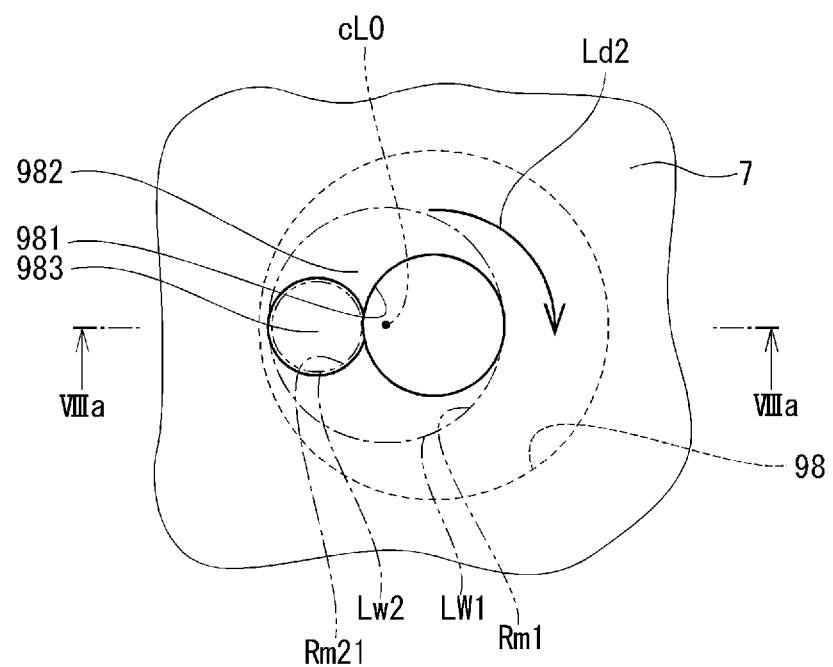
FIG. 8B is a diagram viewed in a direction of arrow VIIIb of FIG. 8A.

Next, in S105, as a "secondary formation step" the laser beam is radiated onto a peripheral part 982 which forms the pilot hole 981. In S105, by modulating the spatial light phase of the laser beam modulated in S104 a focal position is moved, and the peripheral part 982 is irradiated with the laser beam. At this point, a process state of the workpiece member will be described on the basis FIGS. 8A and 8B. FIG. 8A is an enlarged cross-sectional diagram illustrating a portion of the workpiece member 7 irradiated with the laser beam. FIG. 8B is a diagram viewed in the direction of arrow VIIIb of FIG. 8A.

The laser beam that has obtained the intensity distribution of FIG. 7 of S104 is radiated onto the outer wall of the workpiece member 7, such that the peripheral part 982 is irradiated with the laser beam in the processing region Rm21 as illustrated in FIG. 8B. Consequently, in S105, the peripheral part 982 is processed with the laser beam, and an expanded hole 983 which communicates with the pilot hole 981 is formed in a direction which is radially outward of the pilot hole 981 as illustrated in FIGS. 8A and 8B. At this time, part of the laser beam in the region outside the processing region Rm21 within the laser radiation region Rm1 passes through the pilot hole 981 which is completed to enter the workpiece member 7 as illustrated in FIG. 8A. However, with the exception of the processing region Rm21, since the laser beam within the laser radiation region Rm1 does not have an intensity that enables the workpiece member 7 to be processed, damage is not caused to the inner wall surface of the workpiece member 7.

In S105, in order to sequentially process portions of the peripheral part 982, as indicated by a solid arrow Ld2 of FIG. 8B, the focal position of the laser beam is moved along the circumferential direction of the pilot hole 981, whereby the processing region Rm21 is moved. Consequently, expanded holes 983 are formed around the pilot hole 981 in the radially outward direction thereof.

Next, in S106 it is determined whether an intensity of light is equal to or less than a second threshold value. In S106, the control unit 19 determines whether the intensity of reflection light or plasma light from the workpiece member 7 received by the light detection unit 17 is equal to or less than the preset second threshold value in the same manner as in S103. In other words, it is determined whether the expanded hole 983 has been made through the workpiece member 7 on the basis of a change in the intensity of reflection light or plasma light.

At S106, if it is determined that the intensity of light received by the light detection unit 17 is equal to or less than the second threshold value, the method proceeds to S107. If it is determined that the intensity of light received by the light detection unit 17 is equal to or greater than the second threshold value, the method returns to S105 and continues irradiating the workpiece member 7 with the laser beam having the intensity distribution illustrated in FIG. 7.

In S106, if it is determined that the intensity of reflection light or plasma light from the workpiece member 7 received by the light detection unit 17 is equal to or less than the second threshold value, then in S107, the control unit 19 determines whether the laser beam having the intensity distribution illustrated in FIG. 7 has been radiated onto the entire peripheral part 982. The control unit 19 determines whether the laser beam having the intensity distribution illustrated in FIG. 7 has been radiated onto the entire peripheral part 982 on the basis of a program input in advance. If the control unit 19 determines that the laser beam has been radiated onto the entire peripheral part 982, the current routine is finished. If the control unit 19 determines that the laser beam has not been radiated onto the entire peripheral part 982, the method returns to S105 and irradiates a portion of the peripheral part 982 which has not been processed into the expanded hole 983 with the laser beam having the intensity distribution illustrated in FIG. 7.

According to the method for processing the workpiece member 7 of the present embodiment, the injection hole 98 is made into the workpiece member 7 in this manner, and the nozzle body 93 is manufactured.

Conventionally, when an injection hole is made in a workpiece member using a laser beam, the laser beam used for making the injection hole enters the workpiece member through the finished injection hole. When the laser beam which has entered the workpiece member is radiated onto the inner wall surface of the workpiece member located in the radiation direction of the laser beam, there is a concern that that the inner wall surface of the workpiece member may be damaged.

Figure 21:
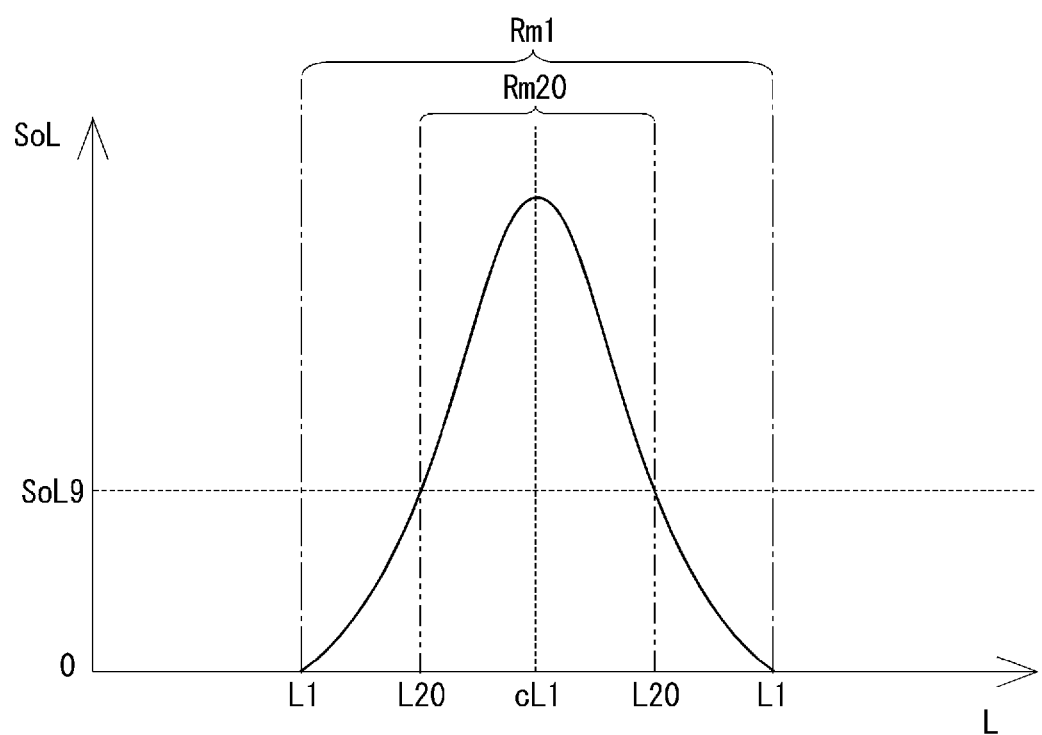
FIG. 21 is a feature diagram illustrating the intensity distribution of the laser beam associated with a method for manufacturing a member according to a comparative example.

Here, a method for processing a workpiece member according to comparative example will be described in detail on the basis FIGS. 21, 22A, and 22B.

According to the method for processing a workpiece member of the comparative example, firstly, the pilot hole 981 is formed using the laser beam having a beam diameter which has twice the length of the distance L1 as in the present embodiment. After the pilot hole 981 is formed, the expanded hole 983 is formed by irradiating the peripheral part 982 of the pilot hole 981 with the laser beam. According to the method for processing a workpiece member of the comparative example, an intensity distribution of the laser beam for formation the expanded hole 983 is not changed from the intensity distribution of the laser beam for formation the pilot hole 981. Specifically, the laser beam used in the method for processing a workpiece member according to the comparative example has the strongest intensity in the center cL1 of the laser beam as illustrated in FIG. 21, and the intensity of the laser beam decreases as a distance from the center cL1 increases. Therefore, a region from the center cL1 to the distance L20 is a processing region Rm20 which has energy that enables the workpiece member 7 to be processed. The processing region Rm20 is located substantially in the center of the laser radiation region Rm1. The diameter of the processing region Rm20 is the same as the diameter of the pilot hole 981.

Figure 22A:
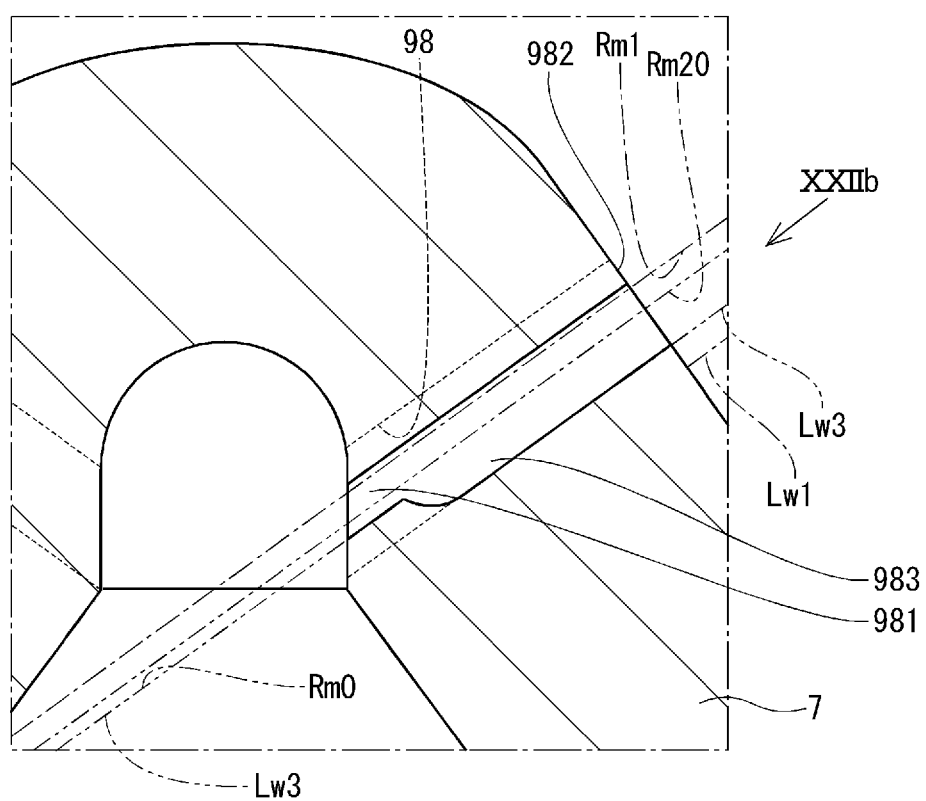
FIG. 22A is a schematic diagram which describes a step of the method for manufacturing a member according to the comparative example.
Figure 22B:
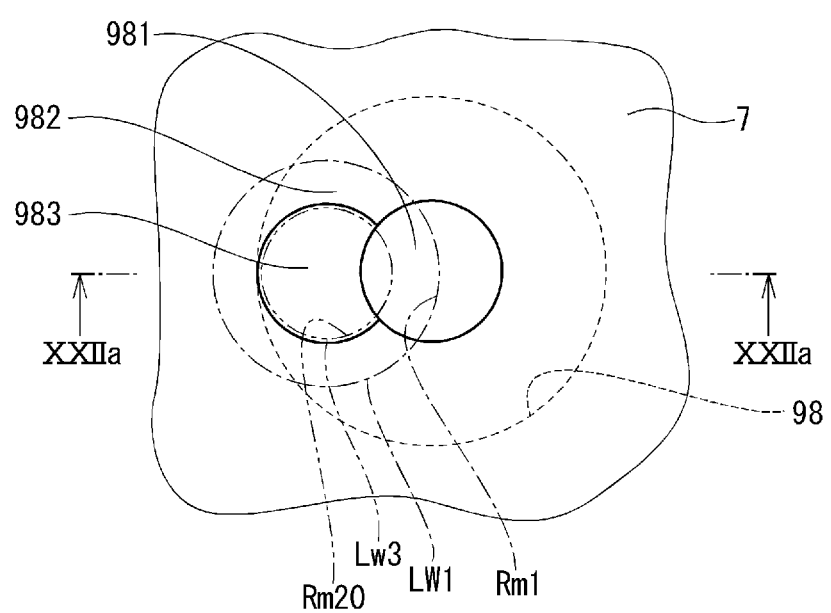
FIG. 22B is a diagram viewed in a direction of arrow XXIIb of FIG. 22A.

FIGS. 22A and 22B illustrate a processing state of the workpiece member 7 when the expanded hole 983 is formed with the method for processing a workpiece member according to comparative example. FIG. 22A is an enlarged cross-sectional diagram illustrating a portion of the workpiece member 7 irradiated with the laser beam. FIG. 22B is a diagram viewed across a direction of arrow XXIIb of FIG. 22A. In FIGS. 22A and 22B, the outer edge of the processing region Rm20 defined in FIG. 21 is indicated by dashed-two dotted line Lw3.

As illustrated in FIG. 22B, when the expanded hole 983 is formed, the laser beam is radiated onto the workpiece member 7 such that the peripheral part 982 of the pilot hole 981 is irradiated with the laser beam in the processing region Rm20. At this time, the laser beam in a partial region Rm0 of the processing region Rm20 which is not utilized for processing the peripheral part 982 enters the workpiece member 7 through the pilot hole 981. The laser beam in the region Rm0 that has entered the workpiece member 7 is radiated onto the inner wall surface of the workpiece member 7, causing damage to the inner wall surface of the workpiece member 7.

(1) With the method for processing the workpiece member 7 according to the present embodiment, a light intensity from the workpiece member 7 which is received by the light detection unit 17 is lower after the pilot hole 981 is completed and penetrates through the workpiece member 7, than a light intensity before the pilot hole 981 is made to penetrate through the workpiece member 7. In this regard, after it is determined that the intensity of light detected by the light detection unit 17 is equal to or less than the first threshold value, the spatial light phase of the laser beam oscillated by the laser oscillator 13 is modulated such that the outer edge region Rm3 has a larger intensity than the middle region Rm4. Next, the laser beam having the modulated spatial light phase is radiated onto the peripheral part 982 to form the expanded hole 983 which communicates with the pilot hole 981. At this time, since the laser beam that reaches an inside the workpiece member 7 through the pilot hole 981 is a laser beam in the region which is outside the processing region Rm21 and within the laser radiation region Rm1, the workpiece member 7 is not damaged, even when the inner wall surface of the workpiece member 7 is irradiated with such light. Consequently, the inner wall surface of the workpiece member 7 can be prevented from being damaged by the laser beam passing through the pilot hole 981 or the expanded hole 983.

(2) According to the method for processing the workpiece member 7 of the present embodiment, since the inner wall surface of the workpiece member 7 can be prevented from being damaged by the laser beam passing through the pilot hole 981, there is no need to provide a laser shielding member for prevention of damage to the inner wall surface of the workpiece member 7, due to the laser beam reaching the inside the workpiece member 7. As a result, the cost of manufacturing the nozzle body 93 can be reduced and a number of steps needed for insertion and removal a laser shielding member when making the injection hole 98 can also be reduced.

(3) In the laser processing device 1 according to the present embodiment, the optical element unit 15 is provided such that modulation of a focal position by changing the spatial light phase of a laser beam can be performed. Consequently, when expanded holes 983 are formed, positional displacement can be prevented compared to a case in which a rotator and a Galvano scanner that needs to be driven are used to change the focal position of the laser beam. Thus, the injection hole 98 can be formed with a high degree of accuracy.

(4) The laser processing device 1 according to the present embodiment controls the intensity distribution of the laser beam on the basis of the detection result provided by the light detection unit 17 when the respective pilot hole 981 and the expanded hole 983 is made through the workpiece member 7. Consequently, the intensity distribution of the laser beam can be changed immediately after the pilot hole 981 and the expanded hole 983 are made through the workpiece member 7, and thus the energy consumption required for making the injection hole 98 can be reduced. As a result, the cost of manufacturing the nozzle body 93 can be reduced.

(5) The light detection unit 17 is provided such that plasma light of fine particles, which are generated from the workpiece member 7 through the laser beam processing, can be received. As a result, determination as to whether the pilot hole 981 and the expanded hole 983 have been made to pass through the workpiece member 7 with plasma light is easily performed compared to a reflection light of the laser beam that is reflected by the outer wall surface of the workpiece member 7, and thus may be changed in accordance with the shape of the workpiece member 7. The pilot hole 981 and the expanded hole 983 can be therefore reliably made through the workpiece member 7.

Second Embodiment

Next, a method for processing a workpiece member according to the second embodiment of the present disclosure will be described based on FIGS. 9A and 9B. The intensity distribution of the laser beam for formation an expanded hole in the second embodiment is different from that in the first embodiment. Note that portions which are substantially identical to those of the first embodiment are denoted by the same reference signs, and the description thereof is omitted.

The intensity distribution of laser beam that is radiated onto the workpiece member 7 when the expanded hole 983 is formed with the method for processing the workpiece member 7 according to the second embodiment will be described on the basis FIG. 9A. FIG. 9A is a diagram illustrating the intensity distribution of laser beam that is radiated onto the workpiece member 7 through the condenser lens 142, with the intensity of the laser beam distributed in the direction perpendicular to the traveling direction of the laser beam. In FIG. 9A, a horizontal axis represents the distance L from the center cL0 of laser beam. A vertical axis represents the intensity SoL of laser beam.

Figure 9A:
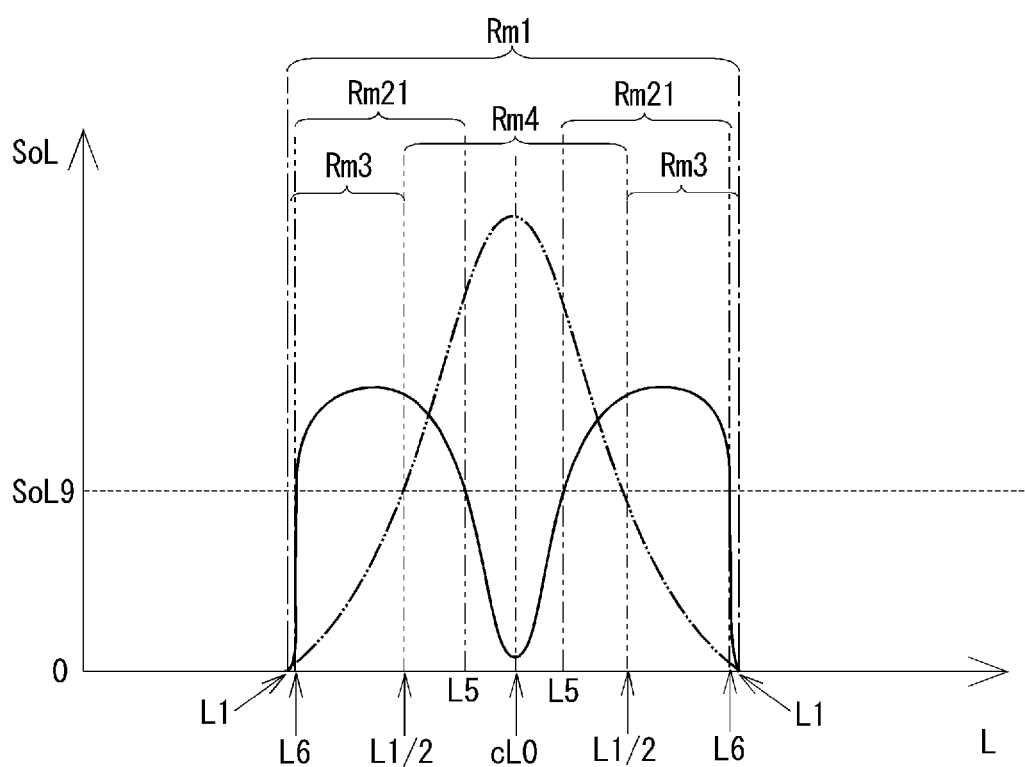
FIG. 9A is a diagram illustrating the intensity distribution of laser beam according to the method for manufacturing a member of a second embodiment of the present disclosure.

As illustrated in FIG. 9A, the spatial distribution of the laser beam which forms the expanded hole 983 in the present embodiment is modulated such that the middle region Rm4 has a smaller intensity than the outer edge region Rm3. In the present embodiment, the laser beam is further modulated such that two processing regions Rm21 between the distance L5 and the distance L6 are provided on outer edge regions Rm3. As a result, the two processing regions Rm21 are located at positions which have shifted from the center of the laser radiation region Rm1.

In the optical element unit 15, a voltage is applied to the electrodes 154, and the liquid crystal layer 152 is operated such that the laser beam which is oscillated by the laser oscillator 13 has the intensity distribution illustrated in FIG. 9A.

Figure 9B:
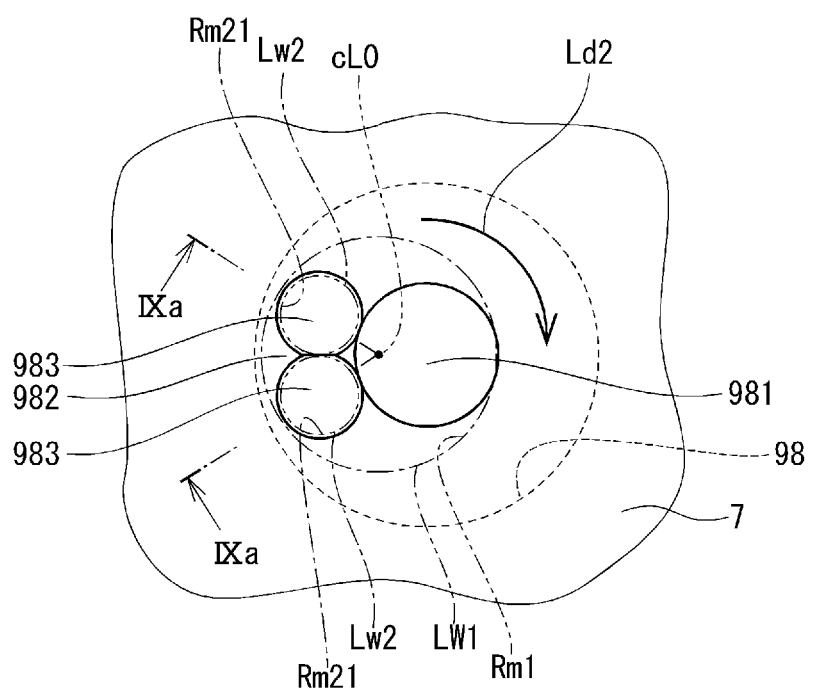
FIG. 9B is a schematic diagram which describes a step of the method for manufacturing a member according to the second embodiment of the present disclosure.

A processing state of the workpiece member 7 is illustrated in FIG. 9B is when the expanded hole 983 is formed with laser beam having the intensity distribution illustrated in FIG. 9A. FIG. 9B is a schematic diagram of the pilot hole 981 and the expanded holes 983 viewed from the direction of laser beam radiation. In FIG. 9B, a cross-sectional line of laser beam having the intensity distribution illustrated in FIG. 9A is indicated as a line IXa-IXa.

As illustrated in FIG. 9B, when laser beam having the intensity distribution illustrated in FIG. 9A is radiated onto the peripheral part 982 of the pilot hole 981, two expanded holes 983 can be simultaneously formed in the peripheral part 982. Consequently, the method for processing the workpiece member 7 according to the present embodiment can shorten a time needed to form the expanded holes 983. Therefore, the second embodiment can achieve the same effects as the first embodiment, and can further reduce the number of steps required for the manufacture of the nozzle body 93.

Third Embodiment

Next, a device for manufacturing a member and a method for manufacturing a member according to the third embodiment of the present disclosure will be described on the basis FIGS. 10, 11A, 11B, 12A, and 12B. The working effect of the optical element of the third embodiment is different from that of the first embodiment. Note that portions substantially identical to those of the first embodiment are denoted by the same reference signs, and the description thereof is omitted.

The optical element unit 15 of the laser processing device according to the third embodiment can modulate the spatial light phase of laser beam directed from the optical element unit 15 to the workpiece member 7 and change the spreading angle of laser beam, by changing the array direction of liquid crystal molecules of the liquid crystal layer 152.

Figure 10:
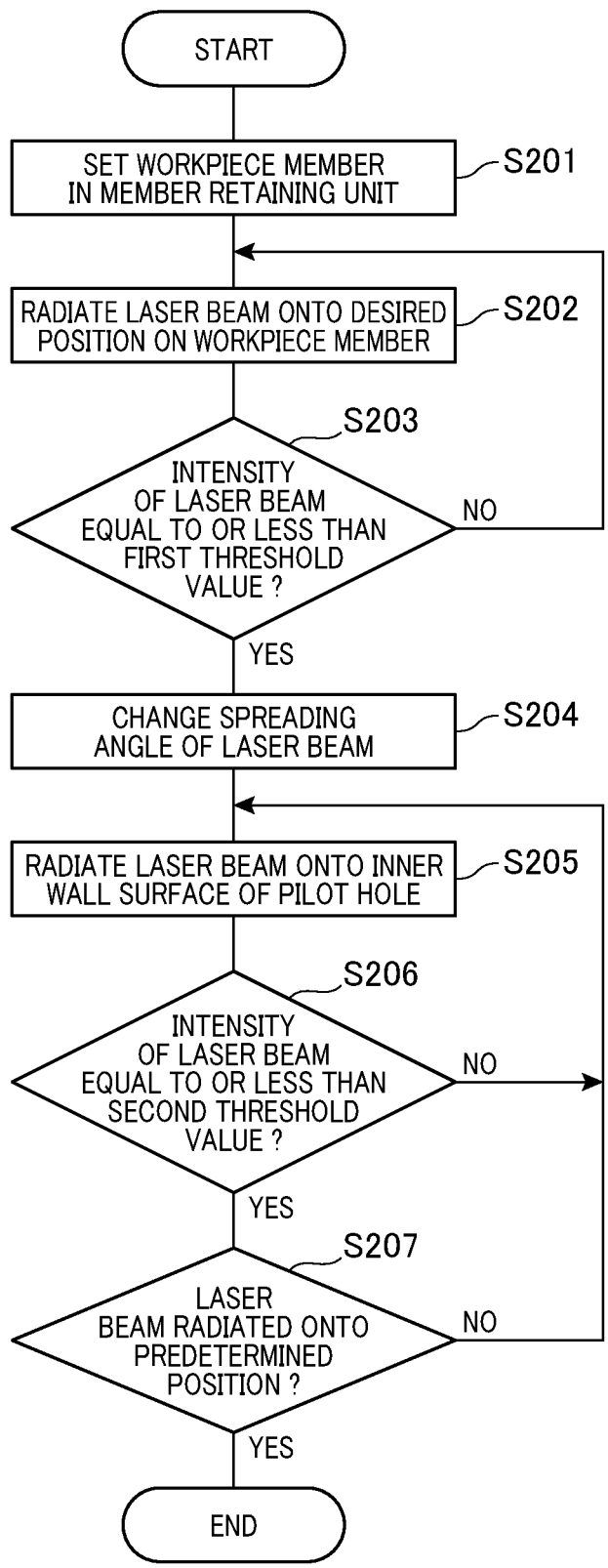
FIG. 10 is a flowchart of a method for manufacturing a member according to a third embodiment of the present disclosure.
Figure 11A:
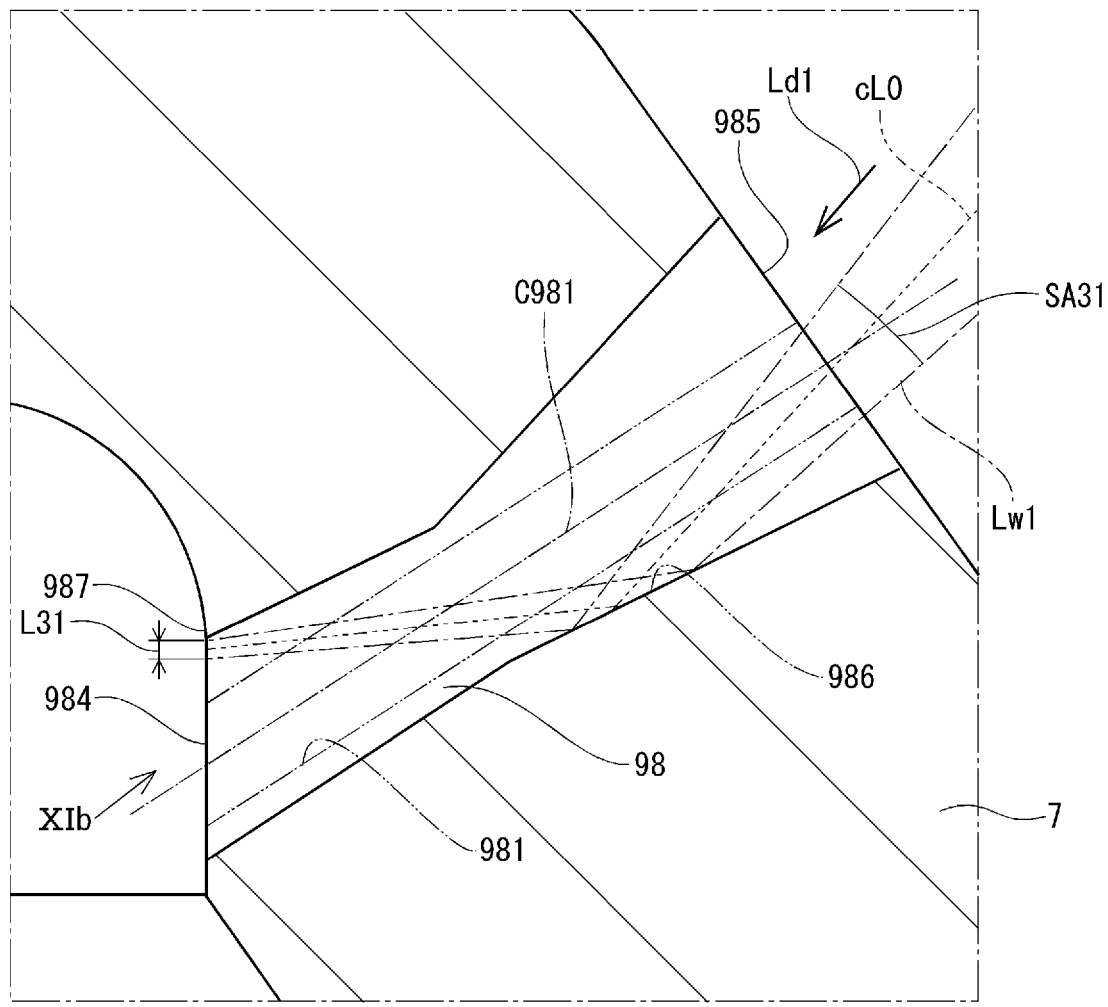
FIG. 11A is a schematic diagram which describes a step of the method for manufacturing a member according to the third embodiment of the present disclosure.
Figure 11B:
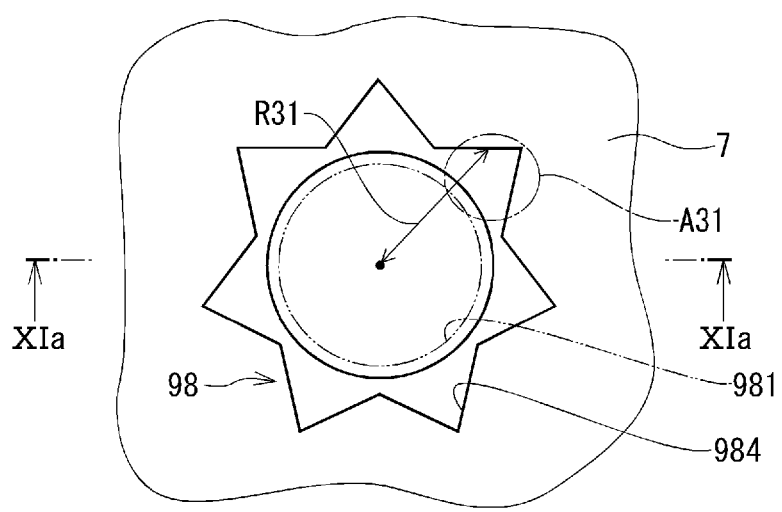
FIG. 11B is a diagram viewed in a direction of an arrow XIb of FIG. 11A.
Figure 12A:
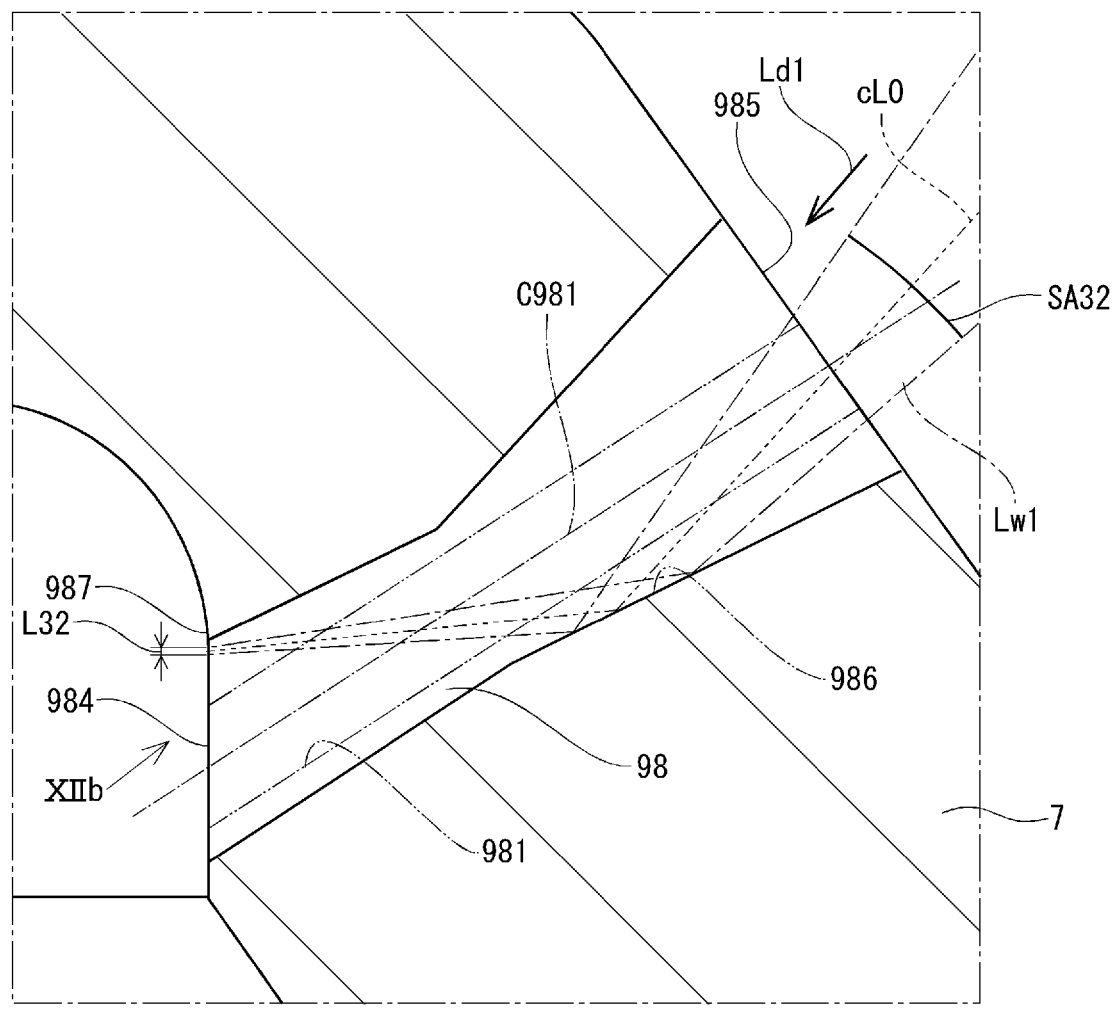
FIG. 12A is a schematic diagram which describes a step of the method for manufacturing a member, which is different from a step of FIG. 11A, according to the third embodiment of the present disclosure.
Figure 12B:
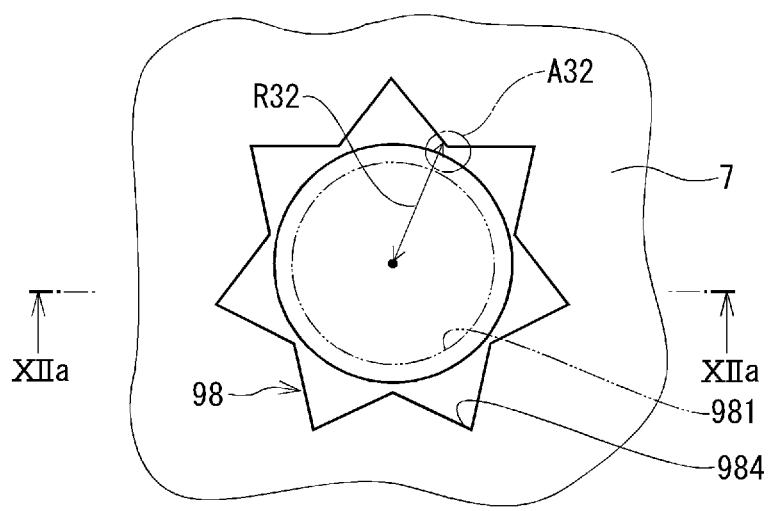
FIG. 12B is a diagram viewed in a direction of an arrow XIIb of FIG. 12A.

Next, the method for processing the workpiece member 7 according to the present embodiment will be described on the basis of FIGS. 10, 11A, 11B, 12A, and 12B. FIG. 10 is a flowchart illustrating the method for processing the workpiece member 7. FIGS. 11A and 12A are cross-sectional diagrams of an enlarged illustration of portions of the workpiece member 7 irradiated with laser beam. FIGS. 11B and 12B are diagrams which are viewed respectively across an arrow XIb of FIG. 11A and across an arrow XIIb of FIG. 12A.

The method for processing the workpiece member 7 according to the present embodiment can be used to form the injection hole 98 in which the cross-sectional shape of the inner wall surface is not linear on a plane including the central axis C981 of the pilot hole 981. For example, as illustrated in FIGS. 11A, 11B, 12A, and 12B, the injection hole 98 which is formed with the method for processing the workpiece member 7 according to the present embodiment has a substantial center of the injection hole 98 with a smaller cross-sectional area than an inner opening 984 of the injection hole 98 and an outer opening 985 of the injection hole 98. The cross-sectional area of the inner opening 984 may be different from or the same as the cross-sectional area of the outer opening 985.

Firstly, in S201, the workpiece member 7 is set in the member retaining unit 11 in the same manner as in S101 of the first embodiment. Next, in S202, as a "primary formation step", a laser beam which forms the pilot hole 981 is radiated onto a desired position on the workpiece member 7 in the same manner as in S102 of the first embodiment. In S203 subsequent to S202, it is determined whether the intensity of light from the workpiece member 7 is equal to or less than the first threshold value in the same manner as in S103 of the first embodiment.

At S203, if it is determined that the intensity of light from the workpiece member 7 received by the light detection unit 17 is equal to or less than the first threshold value, in S204, the optical element unit 15 changes the spreading angle of laser beam, as a "laser modulation step".

Next, in S205, as a "secondary formation step", a laser beam is radiated onto the pilot hole 981 or an inner wall surface 986 of a currently processed injection hole 98 including a partially processed pilot hole 981. Specifically, in S205, the laser beam is incident to the pilot hole 981 with the center cL0 of the laser beam inclined with respect to the central axis C981 of the pilot hole 981.

Here, a working process of changing the spread angle of laser beam in S204 will be described based on FIGS. 11A, 11B, 12A, and 12B along with a working process of irradiating the inner wall surface 986 with laser beam in S205. FIGS. 11A and 11B are diagrams illustrating a state in which the workpiece member 7 is processed using a laser beam having a relatively small spread angle, and FIGS. 12A and 12B are diagrams illustrating how the workpiece member 7 is processed using a laser beam having a relatively small spreading angle. Note that the method for processing the workpiece member 7 according to the present embodiment uses a laser beam which has a relatively high energy, in which a reflection is dominant over absorption in relation to the inner wall surface 986 subjected to irradiation. As illustrated in FIGS. 11A, 11B, 12A, and 12B, the inner wall surface 986 is not parallel to the central axis C981.

As illustrated in FIG. 11A, laser beam that is incident to the pilot hole 981 or to the currently processed injection hole 98 is reflected by the inner wall surface 986 and directed into the workpiece member 7. In the present embodiment, the reflected laser beam is condensed at a peripheral part 987 of the inner opening 984, as a "predetermined portion of the member", and the workpiece member 7 is processed such that the inner opening 984 has a desired shape. At this point, if the spreading angle SA31 of laser beam is relatively small, the laser beam reflected by the inner wall surface 986 has a relatively large beam diameter L31 in the vicinity of the peripheral part 987 of the inner opening 984, as illustrated in FIG. 11A. As a result a large amount of processing for the peripheral part 987 per unit time is necessary. Furthermore, the portion having a relatively large inner diameter R31 is formed, for example, as illustrated in a region A31 of FIG. 11B.

In contrast, in a case where the spread angle SA32 of laser beam that is incident to the pilot hole 981 or to the currently processed injection hole 98 is larger than the spread angle SA31, as illustrated in FIG. 12A, the laser beam reflected by the inner wall surface 986 has a beam diameter L32 which is smaller than the beam diameter L31, in the vicinity of the peripheral part 987 of the inner opening 984. As a result, an amount of time needed for processing the peripheral part 987 per unit time is reduced. Furthermore, the portion having an inner diameter R32 which is smaller than the inner diameter R31 is formed, for example, as illustrated in a region A32 of FIG. 12B.

Note that, in the present embodiment, the area of the reflection surface on the inner wall surface 986 where laser beam which has the spreading angle SA31 is reflected, and the area of the reflection surface on the inner wall surface 986 where the laser beam which has the spread angle SA32 is reflected are the same size. Since laser beam has a constant energy regardless of its spreading angle, a fixed energy per unit area of the laser which beam is radiated onto the reflection surface on the inner wall surface 986.

In S206 subsequent to S205, it is determined whether the intensity of light is equal to or less than the second threshold value, in the same manner as in S106 of the first embodiment. If it is determined in S206 that the intensity of light from the workpiece member 7 received by the light detection unit 17 is equal to or less than the second threshold value, in S207 the control unit 19 determines whether the laser beam has been radiated onto a predetermined position of the peripheral part 987 of the inner opening 984.

According to the method for processing the workpiece member 7 of to the present embodiment, the injection hole 98 is processed onto the workpiece member 7 in this manner, and the nozzle body 93 is manufactured.

According to the method for processing the workpiece member 7 of the present embodiment, the inner opening 984 is made by irradiation of the peripheral part 987 of the inner opening 984 using the laser beam which is reflected by the inner wall surface 986. At this time, the amount of processing per unit time in the peripheral part 987 of the inner opening 984 is changed by changing the spreading angle of laser beam that is incident to the pilot hole 981 or the currently processed injection hole 98. As a consequence, only a laser beam which is required for making the inner opening 984 is incident to the pilot hole 981 or the currently processed injection hole 98, therefore it is difficult for the laser beam that has not been utilized for processing to be radiated onto the inner wall surface of the workpiece member 7. Damage to the inner wall surface of the workpiece member 7 can also be prevented. The third embodiment may thus achieves the effects (1), (2), (4), and (5) of the first embodiment.

Since the amount of processing per unit time can be changed in the present embodiment, the inner opening 984 having a desired shape as illustrated in FIGS. 11B and 12B can be made without being influenced by the shape of the outer opening 985. In this manner, the present embodiment can increase areas which can be processed, especially on an inside of the outer opening 985. As a result, flexibility of the shape of the injection hole 98 can be improved.

Fourth Embodiment

Next, a laser processing device according to the fourth embodiment of the present disclosure will be described based on FIG. 13. The configuration of the optical element unit of the fourth embodiment is different from that of the first embodiment. Note that portions substantially identical to those of the first embodiment are denoted by the same reference signs, and the description thereof is omitted.

Figure 13:
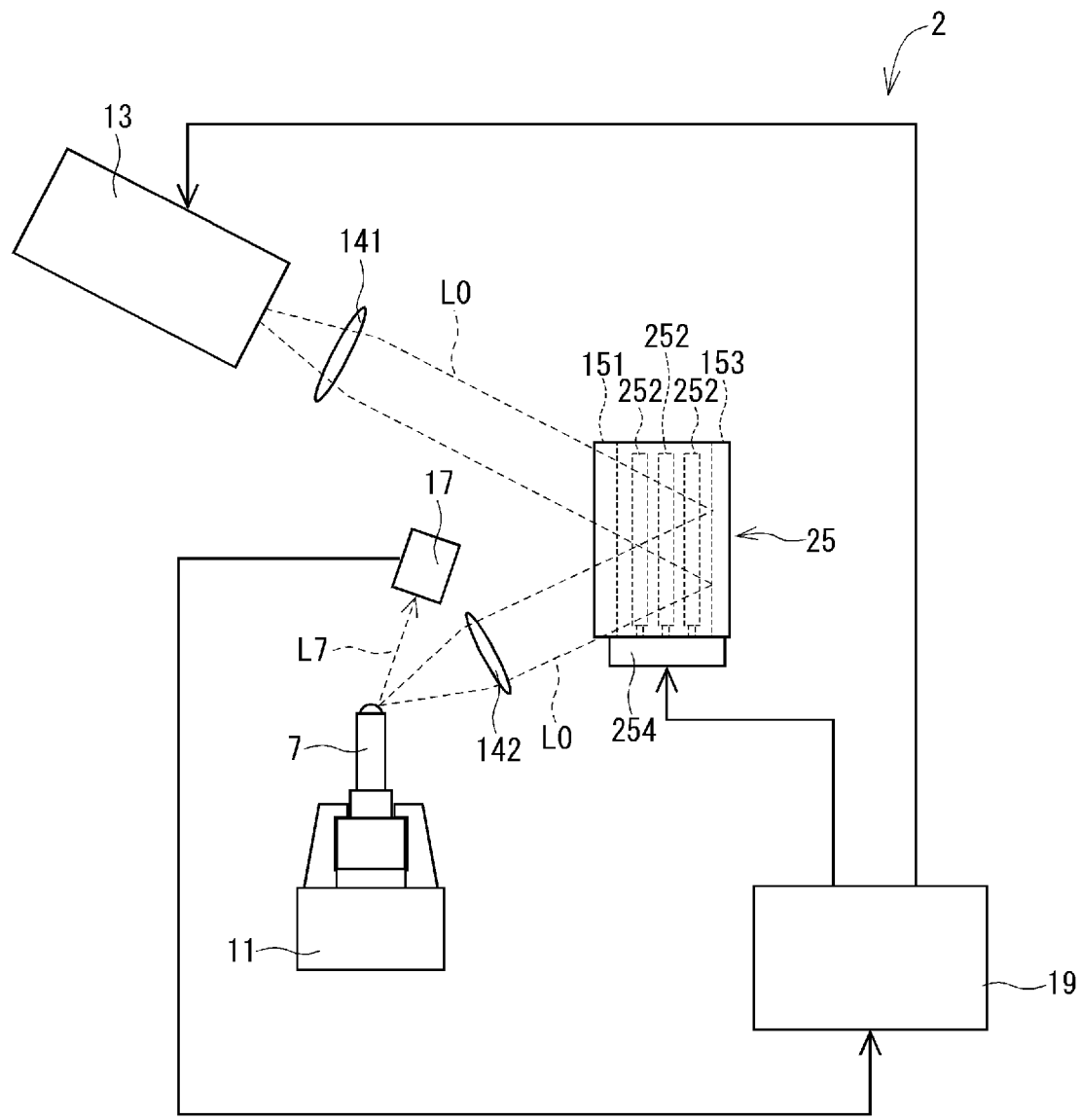
FIG. 13 is a schematic diagram of the device for manufacturing a member according to a fourth embodiment of the present disclosure.

The schematic diagram of the laser processing device 2 according to the present embodiment is illustrated in FIG. 13. The laser processing device 2 includes the member retaining unit 11, the laser oscillator 13, an optical element unit 25, the light detection unit 17, the control unit 19, and the like. Note that, in FIG. 13, the track of laser beam in the laser processing device 2 is indicated by dotted line L0 representing the outer edge of the laser beam. The track of light from the workpiece member 7 is indicated by dotted line L7.

The optical element unit 25 includes the front glass substrate 151, a plurality of diffractive lenses 252, the rear reflective plate 153, and a drive unit 254 electrically connected to the control unit 19, and the like. In the optical element unit 25, when collimated beam which is reflected by the rear reflective plate 153 passes through the plurality of diffractive lenses 252, the diffractive lenses 252 are rotated by the drive unit 254. Consequently, the light diffraction pattern of laser beam directed from the optical element unit 25 to the workpiece member 7 can be changed. The laser beam directed from the optical element unit 25 to the workpiece member 7 is radiated on a desired position on the workpiece member 7 through the condenser lens 142.

The laser processing device 2 can modulate the spatial light phase of laser beam with the plurality of diffractive lenses 252 used in combination with each other. Consequently, the fourth embodiment achieves the same effects as the first embodiment.

Fifth Embodiment

Next, a laser processing device according to a fifth embodiment of the present disclosure will be described based on FIG. 14. The number of light detection units of the fifth embodiment is different from that of the first embodiment. Note that portions substantially identical to those of the first embodiment are denoted by the same reference signs, and the description thereof is omitted.

The schematic diagram of the laser processing device 3 according to the present embodiment is illustrated in FIG.

14. The laser processing device 3 includes the member retaining unit 11, the laser oscillator 13, the optical element unit 15, a plurality of light detection units 17, the control unit 19, and the like. Note that, in FIG. 14, the track of laser beam in the laser processing device 3 is indicated by dotted line L0 which represents the outer edge of the laser beam. The track of light from the workpiece member 7 is indicated by dotted line L7.

Figure 14:
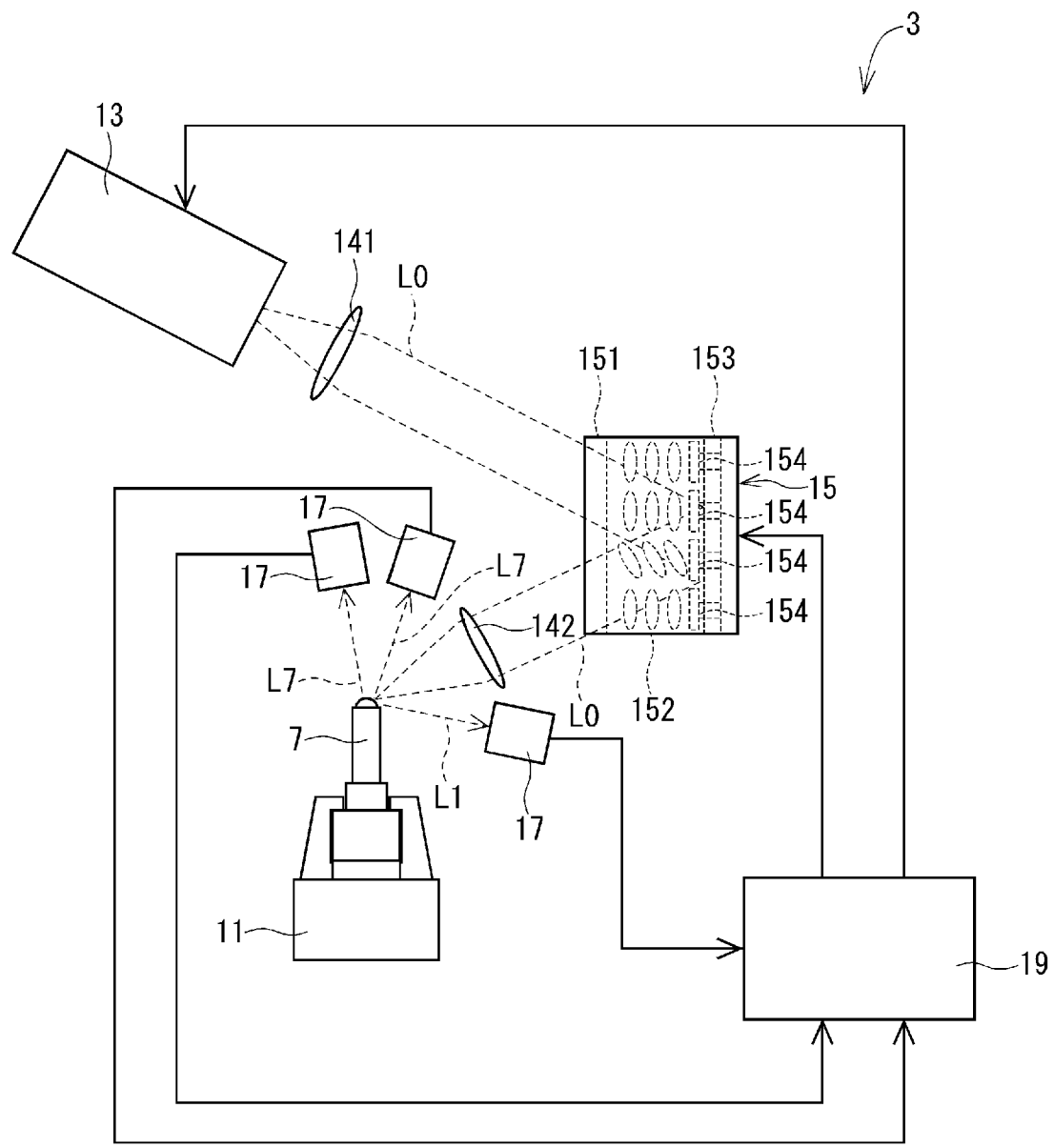
FIG. 14 is a schematic diagram of the device for manufacturing a member according to a fifth embodiment of the present disclosure.

In the laser processing device 3, as illustrated in FIG. 14, the plurality of light detection units 17 are located at various angles relative to the workpiece member 7. As a result, according to the method for processing the workpiece member 7 of the present embodiment, an overall determination as to whether the pilot hole 981 and the expanded hole 983 have been made to pass through the workpiece member 7 on the basis of changes in laser reflection light can be detected by the plurality of light detection units 17. Therefore, the fifth embodiment can achieve the same effects as the first embodiment, and can form the injection hole 98 with a high degree of accuracy.

Sixth Embodiment

Next, a laser processing device according to the sixth embodiment of the present disclosure will be described based on FIGS. 15, 16, and 17. The sixth embodiment includes a laser shielding member, which is different from the first embodiment. Note that portions substantially identical to those of the first embodiment are denoted by the same reference signs, and the description thereof is omitted.

Figure 15:
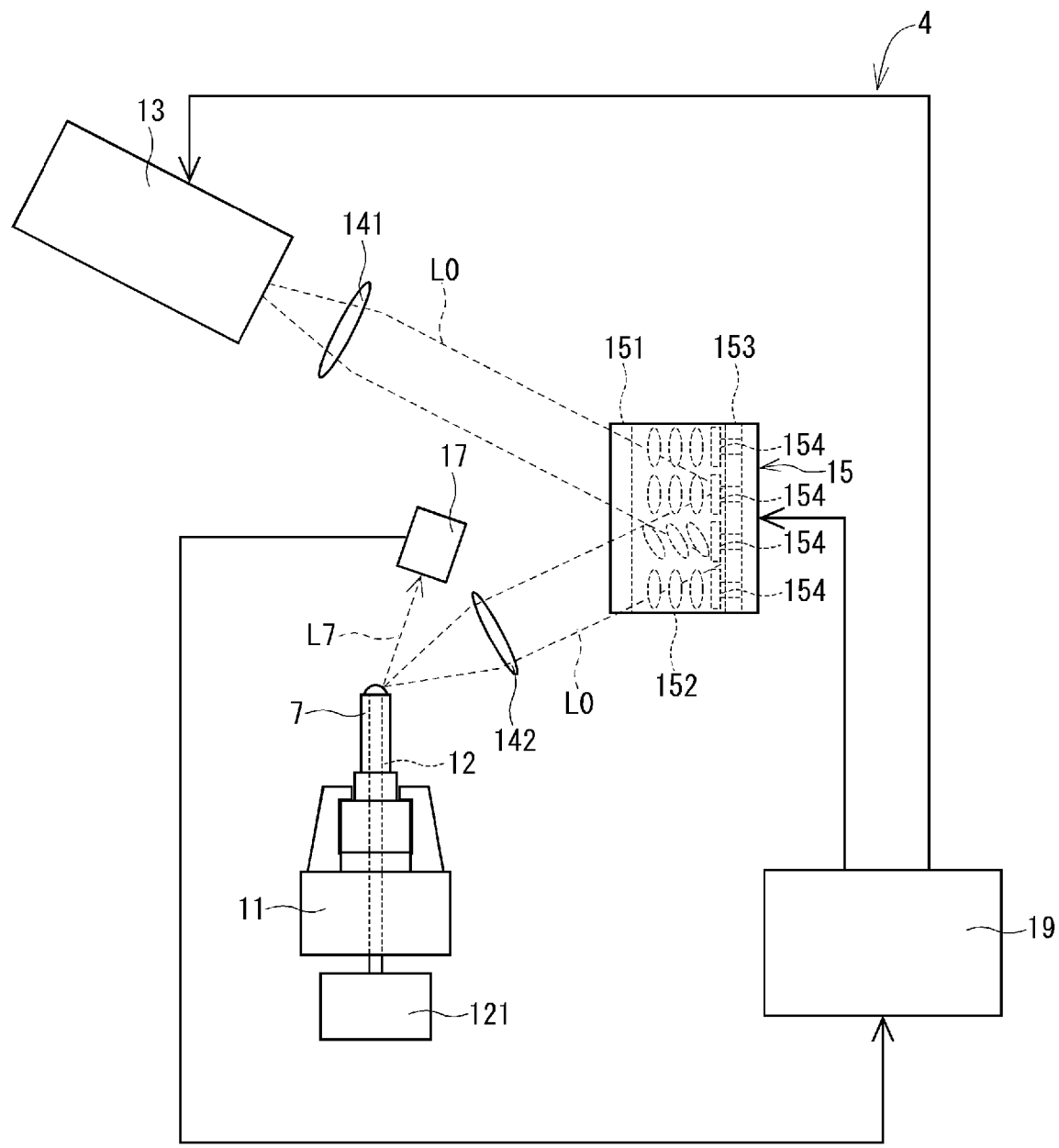
FIG. 15 is a schematic diagram of the device for manufacturing a member according to a sixth embodiment of the present disclosure.
Figure 16:
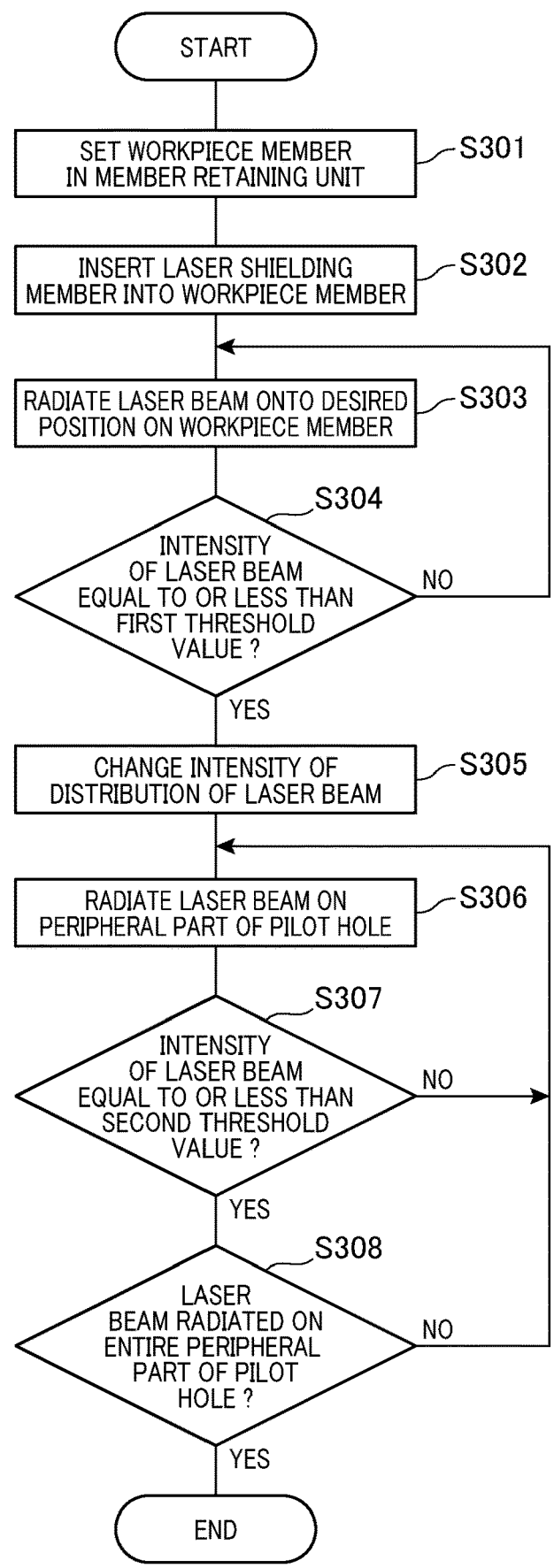
FIG. 16 is a flowchart of the method for manufacturing a member according to the sixth embodiment of the present disclosure.

The schematic diagram of the laser processing device 4 according to the present embodiment is illustrated in FIG. 15. The laser processing device 4 includes the member retaining unit 11, a laser shielding member 12, the laser oscillator 13, the optical element unit 15, the light detection unit 17, the control unit 19, and the like. Note that, in FIG. 15, the track of laser beam in the laser processing device 4 is indicated by dotted line a L0 representing the outer edge of the laser beam. The track of light from the workpiece member 7 is indicated by a dotted line L7.

The laser shielding member 12 is supported by a supporting unit 121, and is configured so that the laser shielding member can be inserted into the workpiece member 7. The supporting unit 121 can rotate the laser shielding member 12 inside the workpiece member 7.

Next, a method for processing the workpiece member 7 according to the present embodiment will be described based on FIG. 16. FIG. 16 is a flowchart illustrating the method for processing the workpiece member 7.

First of all, the workpiece member 7 is set in the member retaining unit 11 in S301 in the same manner as in S101 of the first embodiment. Subsequent to S301, in S302, as a "member installing step", the laser shielding member 12 is inserted into the workpiece member 7. At this time, an outer wall surface 122 of the laser shielding member 12 is provided at a position where laser beam that has passed through the finished pilot hole 981 or the expanded hole 983 is radiated, as shown in an enlarged cross-sectional diagram of the workpiece member 7 illustrated in FIG. 17.

Next, in S303, as a "primary formation step", the laser beam which forms the pilot hole 981 is radiated on a desired position on the workpiece member 7 in the same manner as in S102 of the first embodiment.

In S304 subsequent to S303, it is determined whether the intensity of light from the workpiece member 7 is equal to or less than the first threshold value in the same manner as in S103 of the first embodiment.

If it is determined in S304 that the intensity of light from the workpiece member 7 received by the light detection unit 17 is equal to or less than the first threshold value, the intensity distribution of laser beam is changed in S305, as the "laser modulation step", in the same manner as in S104 of the first embodiment.

Figure 17:
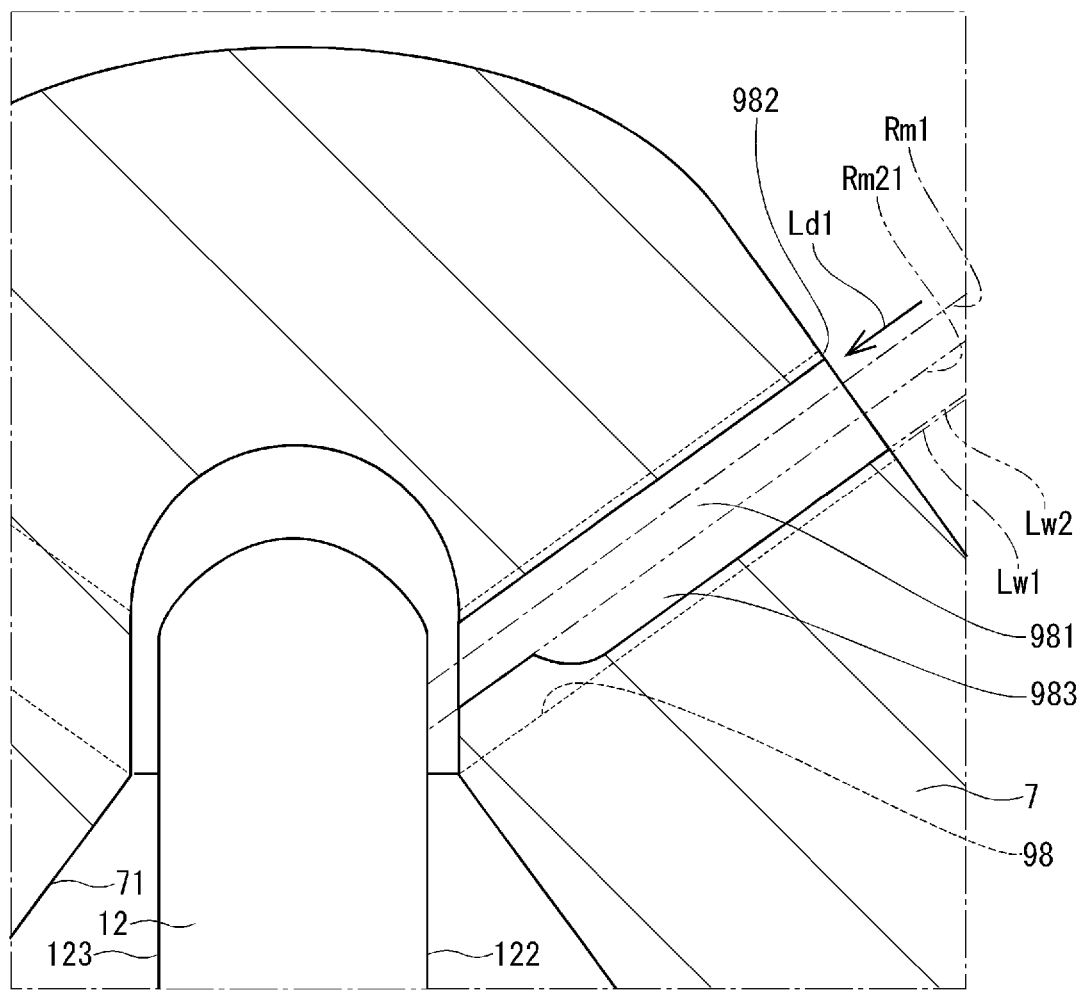
FIG. 17 is an enlarged cross-sectional diagram of the workpiece member according to the method for manufacturing a member of the sixth embodiment of the present disclosure.

After it is determined that the intensity of light from the workpiece member 7 is equal to or less than the first threshold value, as illustrated in FIG. 17, the laser beam is radiated onto the outer wall surface 122 of the laser shielding member 12 through the finished pilot hole 981 until the intensity distribution of laser beam is changed. As a result, the laser beam is not radiated onto an inner wall surface 71 of the workpiece member 7 facing an outer wall surface 123 opposite to the outer wall surface 122 of the laser shielding member 12.

Next, in S306, the laser beam which forms the expanded hole 983 is radiated onto the peripheral part 982 constituting the pilot hole 981, as the "secondary formation step", in the same manner as in S105 of the first embodiment. In S307 subsequent to S306, it is determined whether the intensity of light is equal to or less than the second threshold value in the same manner as in S106 of the first embodiment. In S307, if it is determined that the intensity of light from the workpiece member 7 received by the light detection unit 17 is equal to or less than the second threshold value, in S308, the control unit 19 determines whether the laser beam has been radiated onto the entire peripheral part 982, in the same manner as in S107 of the first embodiment.

According to the method for processing the workpiece member 7 of the present embodiment, the injection hole 98 is made in the workpiece member 7 in this manner, and the nozzle body 93 is manufactured.

The laser processing device 4 includes the laser shielding member 12 that is irradiated with laser beam passing through the open pilot hole 981 or the expanded hole 983. As a result, reliable prevention of irradiation onto the inner wall surface 71 of the workpiece member 7 from laser beam that has entered the workpiece member 7 immediately after the pilot hole 981 is made through the workpiece member 7 or immediately after the expanded hole 983 is made through the workpiece member 7 cam be achieved. Therefore, the sixth embodiment can achieve the effects of the first embodiment (1) and (3) to (5), and can reliably prevent damage to the inner wall surface of the workpiece member 7.

Seventh Embodiment

Next, the method for processing a workpiece member according to the seventh embodiment of the present disclosure will be described based on FIGS. 18, 19, and 20. The method for processing a workpiece member according to the seventh embodiment is different from that of the first embodiment. Note that portions substantially identical to those of the first embodiment are denoted by the same reference signs, and the description thereof is omitted.

Figure 18:
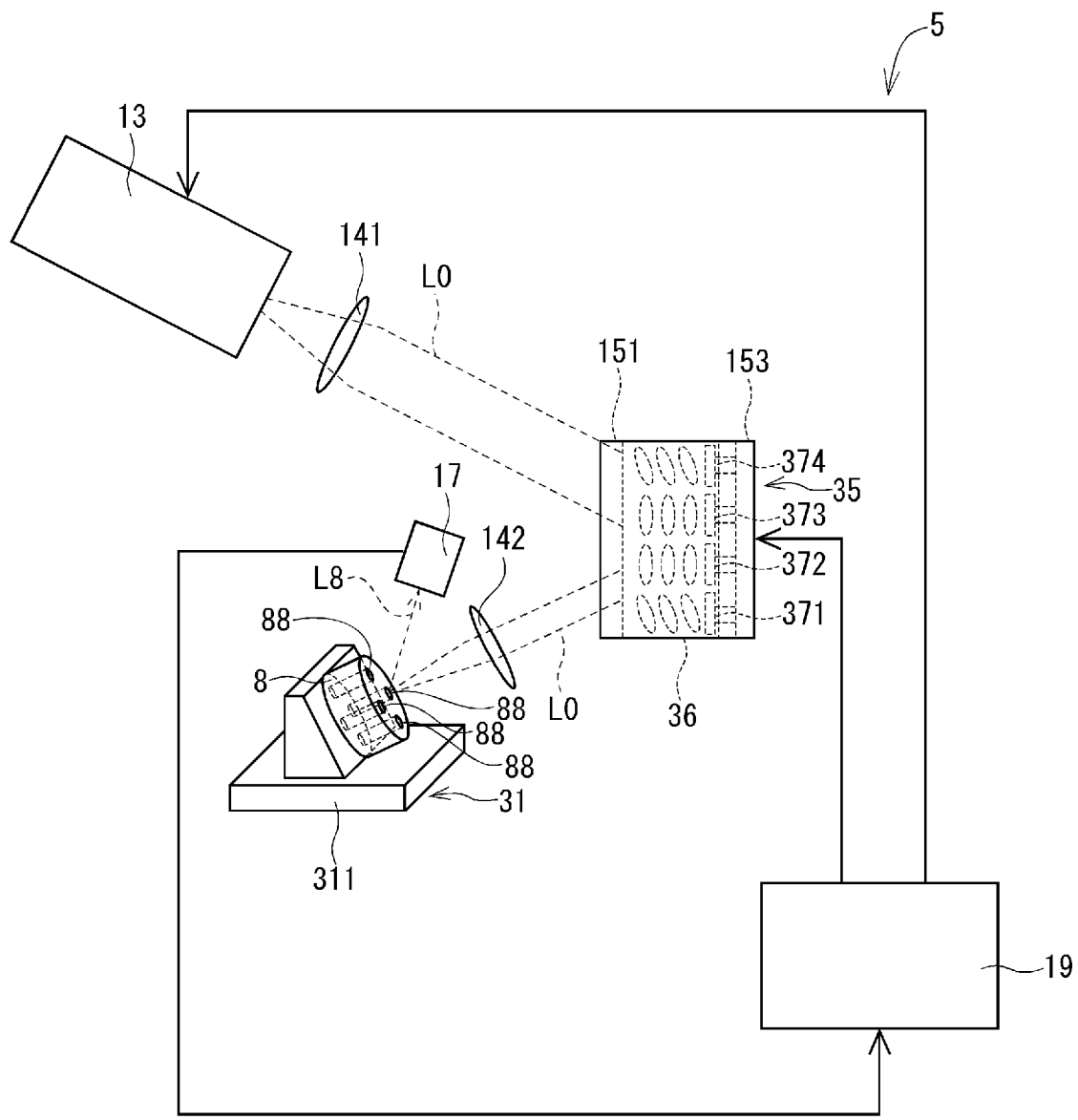
FIG. 18 is a schematic diagram of the device for manufacturing a member according to a seventh embodiment of the present disclosure.

The schematic diagram of a laser processing device 5 according to the present embodiment is illustrated in FIG. 18. The laser processing device 5 includes a member retaining unit 31, the laser oscillator 13, an optical element unit 35, the light detection unit 17, the control unit 19, and the like. The laser processing device 5 can form a plurality of through holes 88 in a workpiece member 8 having a substantially disk-like shape. Note that, in FIG. 18, the track of laser beam in the laser processing device 5 is indicated by dotted line the L0 representing the outer edge of the laser beam. The track of light from the workpiece member 8 is indicated by a dotted line L8.

The member retaining unit 31 can hold the workpiece member 8 such that the workpiece member 8 cannot move relative to the optical element unit 35. The optical element unit 35 is what is called a reflective liquid crystal panel, and includes the front glass substrate 151, a liquid crystal layer 36, the rear reflective plate 153, a plurality of electrodes 371, 372, 373, and 374, and the like. The liquid crystal layer 36 has a plurality of liquid crystal molecules 361, 362, 363, and 364 (refer to FIGS. 19 and 20). In the optical element unit 35, the array directions of the liquid crystal molecules 361, 362, 363, and 364 are individually changed by voltages applied to the electrodes 371, 372, 373, and 374 corresponding to the liquid crystal molecules 361, 362, 363, and 364, respectively.

The method for processing the workpiece member 8 according to the present embodiment will be described based on FIGS. 19 and 20. According to the method for processing the workpiece member 8 of the present embodiment, the spatial light phase of laser beam that is radiated onto the workpiece member 8 is modulated by controlling the array directions of the liquid crystal molecules 361, 362, 363, and 364, and the focal position of laser beam is changed.

Figure 19:
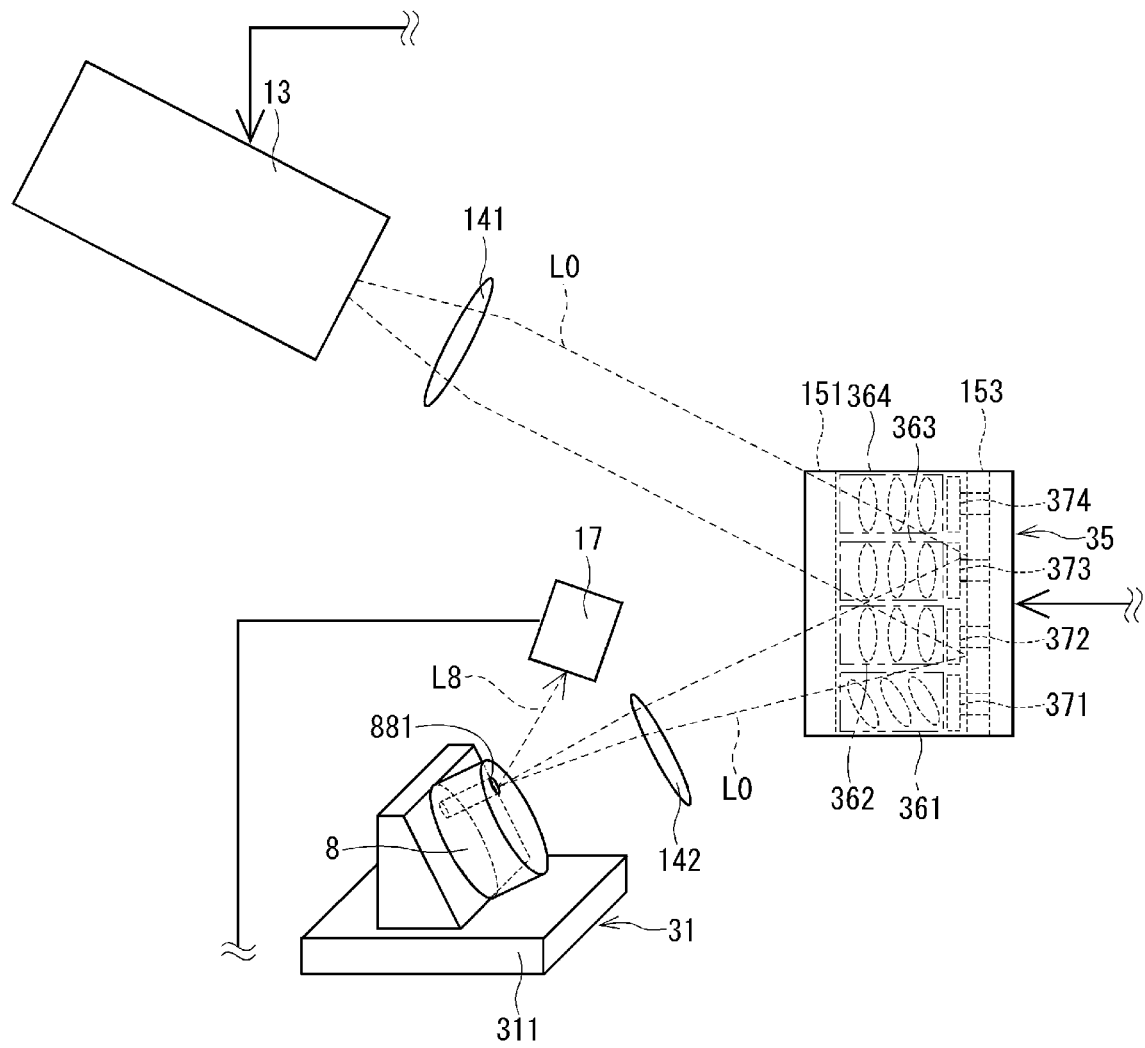
FIG. 19 is a schematic diagram which describes a step of the method for manufacturing a member according to the seventh embodiment of the present disclosure.

For example, as illustrated in FIG. 19, part of the laser beam which is reflected by the rear reflective plate 153 is blocked by the liquid crystal molecules 361. As a result, since the laser beam is focused through the condenser lens 142 on a part of the outer edge of the workpiece member 8 which is away from a base 311 of the member retaining unit 31, the laser beam forms a through hole 881 as one of the through holes 88 in this part of the outer edge apart from the base 311. The through hole 881 is formed by firstly formation of a pilot hole and a then an expanded hole in the peripheral part constituting the pilot hole, as was described in the first embodiment.

Figure 20:
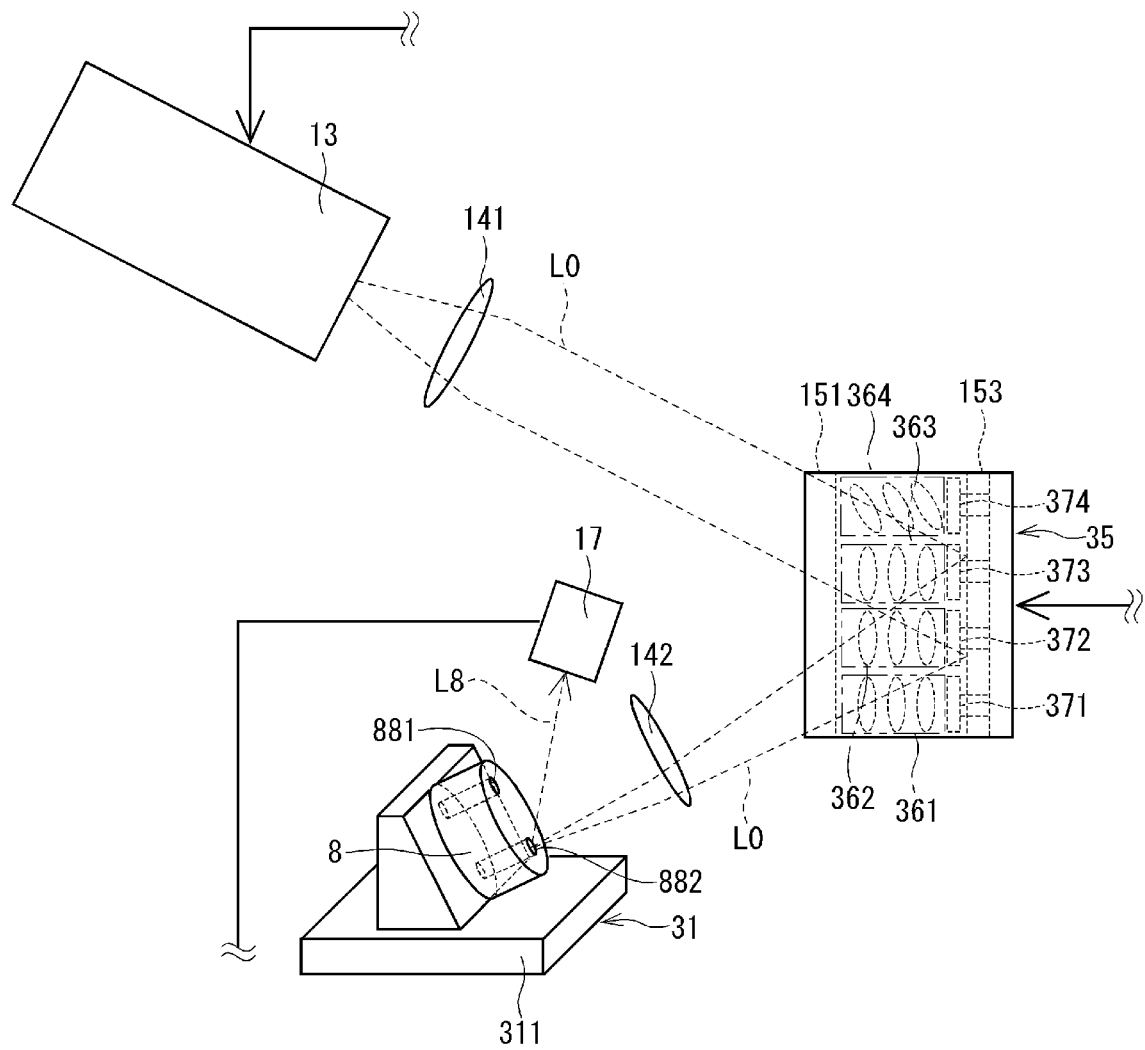
FIG. 20 is a schematic diagram which describes a step of the method for manufacturing a member, which is different from the step of FIG. 19, according to the seventh embodiment of the present disclosure.

After the through hole 881 is formed, as illustrated in FIG. 20, part of the laser beam which is reflected by the rear reflective plate 153 is blocked by the liquid crystal molecules 364. As a result, since the laser beam which is focused through the condenser lens 142 on a part of the outer edge of the workpiece member 8 close to the base 311, the laser beam thus forms a through hole 882 as one of the through holes 88 in this part of the outer edge close to the base 311. The through hole 882 is formed by the formation of a pilot hole and the formation an expanded hole in the peripheral part constituting the pilot hole as in the first embodiment.

When forming the through holes 88, the laser processing device 5 forms expanded holes using laser beam having an intensity of the processing region in the outer edge region. As a result, damage to the member retaining unit 31 which supports the workpiece member 8 by laser beam that has passed through pilot holes and expanded holes can be prevented.

Conventionally, in a case where a plurality of through holes is formed in a single workpiece member using the laser beam, the workpiece member needs to be precisely positioned (aligned) with respect to the focal position of laser beam. This creates a need for a member retaining unit to precisely position the workpiece member, and thus results in an increase in the number of steps for positioning.

The laser processing device 5 can change the array of a plurality of liquid crystal molecules of the optical element unit 35 in order to change the focal position of laser beam. As a result, the plurality of through holes 88 can be formed in a single fixed workpiece member 8. The need for a member retaining unit to position a workpiece member with respect to the focal position of laser beam is eliminated and the cost of equipment for processing the workpiece member 8 can be thus reduced.

The laser processing device 5 electrically controls array directions of a plurality of liquid crystal molecules of the optical element unit 15 in order to change the focal position of laser beam. As a result, the through holes 88 can be formed in a relatively short time, compared to when precise positioning is performed by a member retaining unit. The number of steps required for the manufacture of a member having through holes can be thus reduced.

Other Embodiments

In the above-mentioned embodiments, the "member" is the nozzle body of a fuel injection valve. However, the "member" is not limited to this example. The "member" only needs to have a "through hole".

In the above-mentioned embodiments, the processing region of laser beam is located in the outer edge region when an expanded hole is formed. However, the processing region is not necessarily located in this region. That is, the processing region may be located in any region as long as laser beam in the processing region does not reach the side which opposes the side of the workpiece member which is irradiated by laser beam, through a finished pilot hole.

In the above-mentioned embodiments, the light detection unit can receive reflection light and plasma holes. However, the light detection unit may be able to receive at least one of reflection light and plasma light. The light detection unit may receive any light as long as the intensity thereof is changed when a pilot hole or an expanded hole is made through a workpiece member.

In the above-mentioned embodiments, the optical element unit has a liquid crystal layer or diffractive lenses. However, the configuration of the optical element unit is not limited to this example. The optical element may have any configuration as long as the spatial light phase of laser beam can be modulated through the optical element unit.

In the first to sixth embodiments, a plurality of injection holes may be formed by changing the focal position of laser beam as in the seventh embodiment.

In the second embodiment, the laser beam has two processing regions on the outer edge regions. However, the number of processing regions is not limited to this example. The number of processing regions may be three or more.

In the third embodiment, the spreading angle of laser beam is changed by modulating the spatial light phase of laser beam in the optical element unit. However, the method for changing the spread angle of laser beam is not limited to this example. That is, changing the position of the condenser lens relative to a workpiece member may change the spreading angle of laser beam. In the third embodiment, the intensity distribution of laser beam may be changed as in the first and second embodiments.

In the third embodiment, the laser beam desirably has a relatively high energy. However, the energy of laser beam is not limited to this example. That is, the laser beam may have a relatively low energy.

In the third embodiment, the beam diameter in the vicinity of the peripheral part of the inner opening is relatively large when the spreading angle of laser beam is small, and the beam diameter in the vicinity of the peripheral part of the inner opening is relatively small when the spread angle of laser beam is large. The relation between spreading angles and beam diameters in the vicinity of the peripheral part of the inner opening is not limited to this example. That is, the beam diameter in the vicinity of the peripheral part of the inner opening may also be relatively small when the spread angle of the laser beam is small, and the beam diameter in the vicinity of the peripheral part of the inner opening may be relatively large when the spread angle of the laser beam is large, in relation to the angle between the inner wall surface of an injection hole and the center of the laser beam.

Although the description of the third embodiment only concerns processing the peripheral part of the inner opening, the inner wall surface of an injection hole may be processed while the amount of processing per unit time is changed by changing the spread angle of the laser beam.

In the third embodiment, the peripheral part of the inner opening is processed using the laser beam which is reflected by the inner wall surface of the injection hole that is not parallel to the central axis of the pilot hole. However, the inner wall surface of the injection hole that reflects the laser beam may be parallel to the central axis of the pilot hole.

In the third embodiment, the area of the reflection surface on the inner wall surface of the injection hole, where the laser beam which has a certain spreading angle is reflected, and the area of the reflection surface on the inner wall surface of the injection hole, where the laser beam which has a different spreading angle is reflected are the same size. However, the areas of the reflection surfaces may be different from each other.

In the third and fourth embodiments, a plurality of light detection units may be provided, as in the fifth embodiment, and a laser shielding member may be provided as in the sixth embodiment.

In the fifth embodiment, a laser shielding member may be provided as in the sixth embodiment.

In the seventh embodiment, a laser shielding member may be provided between a workpiece member and the member retaining unit as in the sixth embodiment.

The present disclosure is not limited to the above-mentioned embodiments, and may be implemented in various forms that do not depart from the gist of the disclosure.

The present disclosure has been described with reference to examples. However, the present disclosure is not limited to the embodiments and structures. The present disclosure covers various modifications and equivalent variations. In addition to various combinations and forms, other combinations and forms including one or more/less elements thereof are also within the spirit and scope of the present disclosure.

What is claimed is:

1. A method for manufacturing a workpiece member having a through hole, the method comprising:
   radiating a laser beam to the workpiece member to form, on the workpiece member, a pilot hole having a smaller inner diameter than the through hole
   detecting light from the workpiece member by a light detection unit;
   determining whether an intensity of light detected by the light detection unit is equal to or less than a predetermined threshold value;
   modulating a spatial light phase of the laser beam that is radiated onto the workpiece member in response to determining that the intensity of the light detected by the light detection unit is equal to or less than the predetermined threshold value; and
   radiating the laser beam having the modulated spatial light phase to an edge part of the pilot hole to form the through hole.

2. The method for manufacturing the workpiece member according to claim 1, wherein the spatial light phase of the laser beam is modulated such that an outer edge region within a beam diameter of the laser beam has a larger intensity than a middle region within the beam diameter of the laser beam.

3. The method for manufacturing the workpiece member according to claim 2, wherein the outer edge region includes a plurality of outer edge regions, the plurality of outer edge regions having a larger intensity than the middle region within the beam diameter of the laser beam.

4. The method for manufacturing the workpiece member according to claim 1, wherein the spatial light phase of the laser beam is modulated such that a spreading angle of the laser beam is changed, and a predetermined portion of the workpiece member is processed with the laser beam reflected by an inner wall surface of the through hole.

5. The method for manufacturing the workpiece member according to claim 1, wherein the light detection unit detects the light as at least one of reflection light of the laser beam reflected by the workpiece member and plasma light generated by a reaction between the laser beam and the workpiece member.

6. The method for manufacturing the workpiece member according to claim 1, wherein the spatial light phase of the laser beam is modulated such that an irradiation position on the workpiece member is changed.

7. The method for manufacturing the workpiece member according to claim 1, further comprising:
   providing a laser shielding member on a side of the workpiece member that opposes a side onto which the laser beam is radiated.

8. The method for manufacturing the workpiece member according to claim 1, wherein the workpiece member is a nozzle body and the through hole is an injection hole in the nozzle body.

9. A device for manufacturing a workpiece member having a through hole, the device comprising:
   a laser oscillator configured to radiate a laser beam to form the through hole in the workpiece member;
   an optical element unit configured to modulate a spatial light phase of the laser beam radiated by the laser oscillator;
   a light detection unit configured to detect light from the workpiece member and to output an electric signal based on an intensity of the detected light; and
   a control unit electrically connected to the laser oscillator, the optical element unit, and the light detection unit, the control unit configured to control the laser oscillator and the optical element unit based on the electric signal output by the light detection unit, wherein
   the control unit is further configured to
      control the laser oscillator to radiate the laser beam to form, on the workpiece member, a pilot hole having a smaller inner diameter than the through hole,
      receive the electric signal from the light detection unit,
      determine whether the intensity of the detected light is less than or equal to a predetermined threshold value,
      control the optical element to modulate the spatial light phase of the laser beam on the workpiece member in response to determining that the intensity of the detected light is less than or equal to the predetermined threshold value, and
      drive the laser oscillator to radiate the laser beam with the modulated spatial light phase to an edge part of the pilot hole to form the through hole.

10. The device for manufacturing the workpiece member according to claim 9, wherein
the optical element unit is further configured to change a light diffraction pattern of the laser beam.

11. The device for manufacturing the workpiece member according to claim 9, wherein
the optical element unit is further configured to change a spreading angle of the laser beam.

12. The device for manufacturing the workpiece member according to claim 9, wherein the optical element unit includes a reflective liquid crystal panel.

13. The device for manufacturing the workpiece member according to claim 9, wherein the optical element unit has a plurality of diffraction lenses.

14. The device for manufacturing the workpiece member according to claim 9, wherein the light detection unit includes a plurality of light detection units.

15. The device for manufacturing the workpiece member according to claim 9, further comprising:
a laser shielding member that is provided on an opposite side of the workpiece, the opposite side of the workpiece being opposite to a side of the workpiece irradiated by the laser beam, and the laser shielding member being configured to shield the opposite side of the workpiece from the laser beam.

16. The method for manufacturing the workpiece member according to claim 2, wherein the spatial light phase of the laser beam is modulated such that a spreading angle of the laser beam is changed, and a predetermined portion of the workpiece member is processed with the laser beam reflected by an inner wall surface of the through hole.

17. The method for manufacturing the workpiece member according claim 2, wherein the light detection unit detects at least one of a reflection light of the laser beam reflected by the workpiece member and a plasma light generated by a reaction between the laser beam and the workpiece member.

18. The method for manufacturing the workpiece member according to claim 2, wherein the spatial light phase of the laser beam is modulated such that an irradiation position on the workpiece member is changed.

19. The method for manufacturing the workpiece member according to claim 2, further comprising:
providing a laser shielding member on a side of the workpiece member that opposes a side onto which the laser beam is radiated.

20. A device for manufacturing a workpiece member having a through hole, the device comprising:
a laser oscillator configured to radiate a laser beam to form the through hole in the workpiece member;
an optical element configured to modulate a spatial light phase of the laser beam radiated by the laser oscillator;
a light detection unit configured to detect light from the workpiece member and to output an electrical signal based on an intensity of the detected light; and
a control unit electrically connected to the laser oscillator, the optical element unit, and the light detection unit, the control unit configured to control the laser oscillator and the optical element based on the electrical signal output by the light detection unit, wherein
the optical element is further configured to modulate the spatial light phase of the laser beam such that an outer edge region within a beam diameter of the laser beam has a greater intensity than a middle region within the beam diameter of the laser beam.

* * * * *

UNITED STATES PATENT AND TRADEMARK OFFICE
CERTIFICATE OF CORRECTION

| | |
|---|---|
| PATENT NO. | : 10,967,458 B2 |
| APPLICATION NO. | : 16/072970 |
| DATED | : April 6, 2021 |
| INVENTOR(S) | : Shirai et al. |

Page 1 of 1

It is certified that error appears in the above-identified patent and that said Letters Patent is hereby corrected as shown below:

On the Title Page

"(30) Foreign Application Priority Data
Jan. 12, 2017 (JP) ....................JP2017-003462"
Should be:
-- (30) Foreign Application Priority Data
Jan. 27, 2016 (JP)..................JP2016-013075
Jan. 12, 2017 (JP) ..................JP2017-003462 --

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*